350-3.6
2/14/78    XR    4,074,361

United States Patent [19]
Clow

[11] 4,074,361
[45] Feb. 14, 1978

[54] PARALLEL DATA PROCESSING SYSTEM

[76] Inventor: Richard G. Clow, 624 Black Canyon Stage, Phoenix, Ariz. 85020

[21] Appl. No.: 682,731

[22] Filed: May 3, 1976

Related U.S. Application Data

[63] Continuation-in-part of Ser. No. 543,173, Jan. 22, 1975, abandoned, which is a continuation of Ser. No. 398,332, Sept. 18, 1973, abandoned, which is a continuation of Ser. No. 117,784, Feb. 22, 1971, abandoned, which is a continuation of Ser. No. 720,262, April 10, 1968, abandoned.

[51] Int. Cl.² .......... G06G 9/00; G03H 1/00; H01S 3/101
[52] U.S. Cl. .............. 364/713; 331/94.5 C; 350/3.60; 364/837; 364/900
[58] Field of Search ............ 350/3.5; 331/94.5 C, 331/94.5 M; 235/181; 307/312; 340/172.5

[56] References Cited

U.S. PATENT DOCUMENTS

| | | | |
|---|---|---|---|
| 3,431,437 | 3/1969 | Kosonocky | 307/312 |
| 3,439,289 | 4/1969 | Kosonocky | 307/312 |

Primary Examiner—Ronald J. Stern

[57] ABSTRACT

An optical parallel computing system in which modes of a multi-mode laser are coupled holographically. The bistable state of oscillation of individual modes is controlled by a saturable absorber placed in a part of the laser cavity which permits the control of each mode separately. A mode oscillates on the condition that the amount of optical energy coupled into that mode exceeds a threshold value. The amount of coupling between pairs of modes is dependent on the input data which is presented as a hologram. The output is read from the selection of modes which oscillate. The holographic part of the data processing system is a coherent optical computer which evaluates linear or nonlinear polynomial operators on the input data and can inject a proportional amount of energy into a mode, which then oscillates if the value of the operator exceeds a threshold. Holograms in the coherent optical computer store both data and program for the computing system. Applications include image processing and pattern recognition.

23 Claims, 25 Drawing Figures

FIGURE 9
FIGURE 12
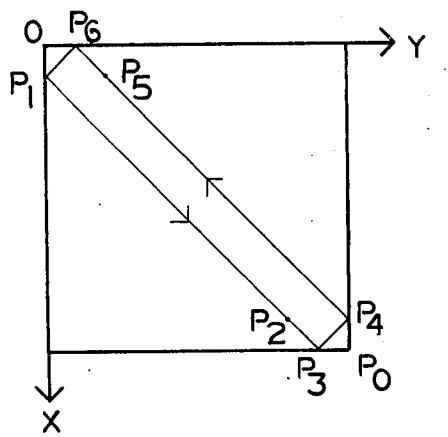
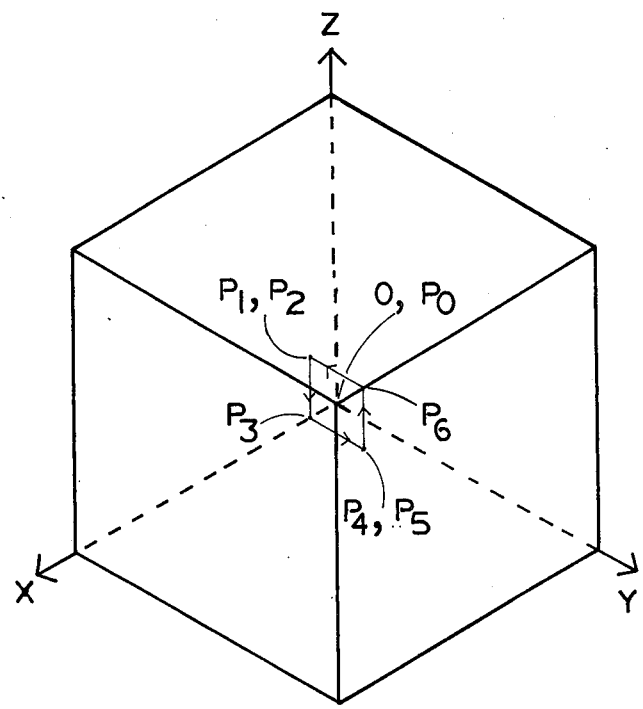
FIGURE 10
FIGURE 11
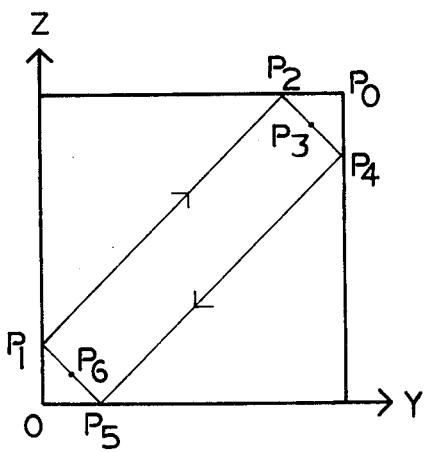
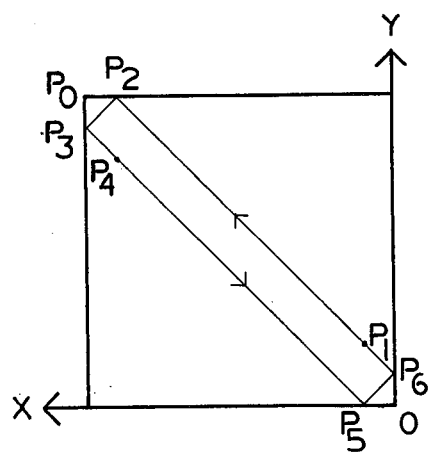

FIGURE 22
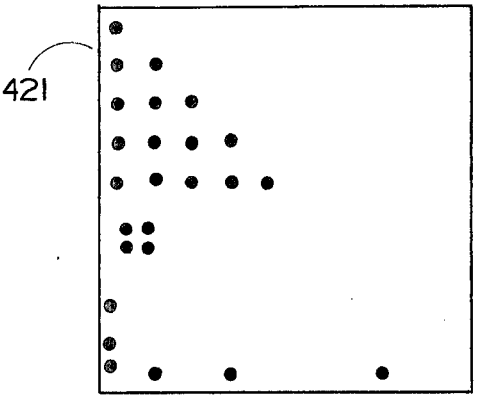
FIGURE 23
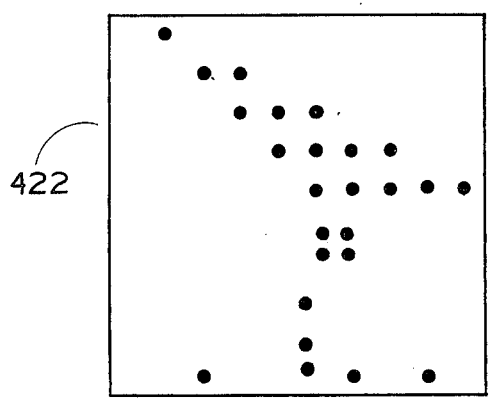
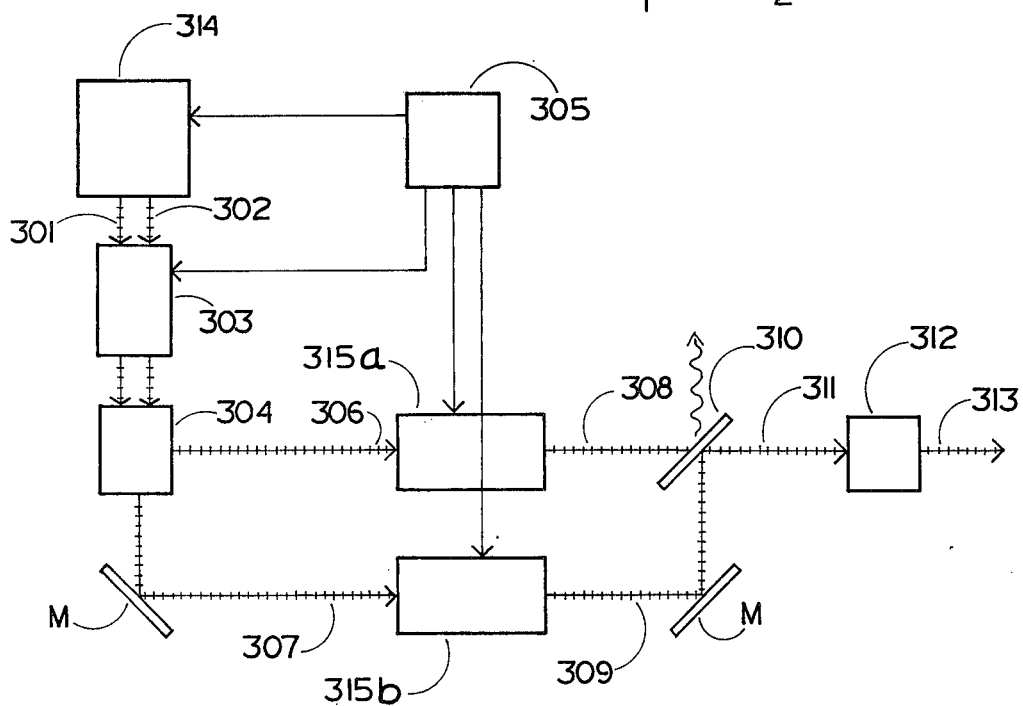
FIGURE 24

PARALLEL DATA PROCESSING SYSTEM

CROSS REFERENCES TO RELATED APPLICATIONS.

This application is a continuation-in-part of application Ser. No. 543,173 filed Jan. 22, 1975 and which is a continuation of application Ser. No. 398,332 filed Sept. 18, 1973, which is itself a continuation of application Ser. No. 117,784 filed Feb. 22, 1971, which in turn is a continuation of application Ser. No. 720,262 filed Apr. 10, 1968, all of which are now abandoned.

BACKGROUND OF THE INVENTION.

This invention is in the field of electrical communications and relates to data processing systems having an internal program element and which represent numerical information by electromagnetic radiation of optical wavelengths, and more particularly relates to such systems as may be applied to pattern recognition.

In early optical computers, input numerical quantities were represented by the optical transmission at one particular point on a photographic transparency and the output by the optical intensity of light rays. When a ray passed through a point on the transparency, an attenuation occurred that represented a multiplication and when several rays converged to a point the intensities combined linearly to provide an additive capability. An account of these "incoherent" optical computers has been given by B. J. Howell, *Jour. Optical Soc. Am.*, Vol. 49, No. 10, p. 1012, Oct. 1959. A typical device of this type directed a ray only once through the input transparency and hence was limited to output functions linear in the input. By redirecting the rays through fibers to repeated passage through the input transparency, Gamba, U.S. Pat. No. 3,323,407, constructed a computer which evaluates nonlinear polynomial functions of the input. A disadvantage of that technique is that the coefficients of the polynomial could not be controlled but were necessarily random; however, Gamba showed that even then, polynomial functions could be very useful in pattern recognition, after a second optical processing stage.

In the 1950's, it was recognized that numbers could be represented by the complex amplitude of the rays, provided the light was sufficiently coherent. When output numbers are represented by the amplitude of coherent optical beams with addition represented by the addition of amplitudes of combined beams, negative numbers can be represented by negative amplitudes. Also subtraction can be performed by destructive interference of the combined beams. This passive coherent optical data processing scheme substantially extended the capacity of incoherent optical computers which could neither represent negative numbers (since intensity can only be positive) nor perform subtraction.

When coherent light was used, it was found practical to direct light through the device by diffraction and to represent input data by the diffractive properties of an input transparency. A typical device of this type is given by C. O. Carlson, U.S. Pat. No. 3,085,469. Although capable of handling certain data processing problems faster than electronic computers, it was found difficult to use negative input data since this required controlling the phase of the rays passing through the transparency. This difficulty was overcome by the introduction of holographic methods. In holography, a data value (or image point) is recorded as a dispersed holographic element (e.g., a photographic "diffraction grating") on either a photographic film or through the volume of a photosensitive block, rather than as a concentration (or point) of photosensitive material. It was found that the "diffraction efficiency" of these overlapping elements was individually controllable to form visible images or to act multiplicatively on the diffracted beam in both phase and amplitude. An excellent account of holography has been given by R. J. Collier, *IEEE Spectrum*, Vol. 3, p. 67, July 1966. Collier also mentions how holograms can act as synthetic mirrors. In an article in *IEEE Spectrum*, Vol. 1, p. 101, Oct. 1964, L. J. Cutrona shows how the masks of earlier optical computers can be replaced with holograms to allow linear computations with negative or complex numbers. In particular, he cites B. A. Vander Lugt, *IEEE Trans. Information Theory*, Vol. IT-10, No. 2, p. 139, Apr. 1964, who shows how complex spatial filters (a special type of linear operation) can be used in pattern recognition by means of an electronic threshold device. Recognition is indicated by a sufficiently bright spot (output value) in the pictorial output of the holographic device. This threshold operation is performed by scanning the output image with an electron beam scanning device and the threshold output is an electronic signal. An optical threshold indication can be produced only by a second scanning process.

The optical parts of these devices are usually called coherent optical computers (the electron beam scanner part is excluded from the definition of this term). Coherent optical computers are characterized by their representation of input data by the diffractive properties of an input film (or hologram), diffraction of optical input beams incident on this film (or hologram) to perform multiplication, combining these diffracted beams to perform addition and representing the results of the computing operation by the amplitudes of coherent optical beams. They may also contain one or more other diffractive films (or holograms) which serve to direct optical beams and store the coefficients of the linear operators which the computer evaluates. For example, in Vander Lugt's device, this coefficient store is called "the holographic spatial filter", and acts essentially as a read-only memory for this computer.

In coherent optical computers, optical energy is furnished to the computer by one or more specifically directed optical rays or beams. The function which the computer evaluates at any particular output point or on any particular output beam may be changed by providing alternate optical input rays of beams. Typically this causes beams to impinge on the coefficient store (or hologram) from a different direction or to be incident on a different part of the coefficient store (or hologram) so as to alter the coefficients of the linear form which the computer evaluates. Providing such an alternate optical beam is thus equivalent to providing a different program for the computer.

Data processing speeds of coherent optical computers are usually very high because many output values are computed simultaneously in parallel from the input data. Typically each output beam corresponds to a separate point on an output image. However, these computers can evaluate only linear functions. Nonlinearities (such as threshold operations) must be introduced electronically thus destroying the parallel action and high data rate. Another limitation of coherent optical computers is that they are passive (non-amplifying) and their output beams are of quite low intensity. A following stage of optical parallel processing is therefore not practical.

In co-pending application Ser. No. 679,552 filed Apr. 23, 1976, entitled *Coherent Optical Computer for Polynomial Evaluation*, the applicant has disclosed how the above described coherent optical computers may be improved by redirecting beams diffracted by a hologram representing input data so that such beams are diffracted again by that hologram, thus producing beams with amplitudes proportional to powers and products of input variables. Several such beams can be combined to produce output beams having amplitudes proportional to nonlinear polynomial functions of the input variables, a holographic analog of Gamba's invention. If the input data are suitably presented and the output beams suitably interpreted, these nonlinear polynomials may be considered as Boolean polynomials or logic functions.

Since any logic function may be represented as a Boolean polynomial, the above described polynomial computers are potentially widely applicable. The usefulness of real valued polynomials (truncated power series) for approximating continuous functions is well known. The application of polynomial discriminant functions to pattern recognition has been described by D. F. Specht, *IEEE Trans. Electronic Computers*, Vol. EC-16, No. 3, p. 308, June 1967. However, these coherent optical polynomial computers are not able to perform threshold operations, nor do they have any amplifying action.

The intense source of coherent light needed for coherent optical computers was supplied with the invention of the laser by A. L. Schawlow and C. H. Townes, *Physical Review*, Vol. 112, No. 6, p. 1940, Dec. 1958. The laser is an optically resonant cavity in which an optically amplifying medium is included. Most cavities have very many oscillating modes and Schawlow and Townes showed how to suppress all but one mode (corresponding to an individual ray or point source) in order to get light of the greatest coherence. Later it was found that multi-mode lasers are useful, e.g., the controllable multiple ray outputs can be used in optical scanning as described by R. V. Pole, et al., on page 351 of *Optical and Electrooptical Information Processing*, M. I. T. Press, 1965. Also multi-mode lasers were employed by W. A. Hardy, U.S. Pat. No. 3,293,565 and J. A. Soules, et al., U.S. Pat. No. 3,292,103, for image amplification, each point being amplified by one mode. In a later paper entitled "Reactive Optical Information Processing", *Applied Optics*, Vol. 6, p. 1571, Sept. 1967, Pole, et al., have shown how the modes of a multi-mode laser may be coupled by an in-cavity hologram to make more efficient use of the coherent light. Technical information on lasers can be obtained from texts such as *laser: Light Amplifiers and Oscillators*, by D. Ross, published by Akademische Verlagsgesellschaft, Frankfurt am Main, in 1966. A more recent American edition is available from Academic Press.

In the meantime, a different body of computing art grew around the electronic digital computer in which all arithmetic computations are reduced to the logic functions "plus", "times" and "negation" operating on the binary numbers "0" and "1". See, for example, the article by D. C. Evans, *Scientific American*, Vol. 215, No. 3, p. 75, Sept. 1966. These general purpose computers, so common today, are serially organized according to a concept first described by Von Neumann, et al., in 1946, i.e., they calculate one step at a time according to a stored program. See, for example, the book *Computers*, by Shirley Thomas, Holt, Rinehart & Winston, N.Y., 1965. This serial nature is in sharp contrast to the parallel nature of the optical computers previously discussed. In mathematical terms, the computers described by Howell and Cutrona compute a multitude of linear functions of (or "functionals of" or "operators on") the input variables (or input data, or input), and they compute each of these very many functions simultaneously. This parallel organization allows an inexpensive optical computer to compute its limited repertoire of functions much faster than even the most expensive electronic serial computer. The basic limitation on speed in the serial computer is the necessity of transferring information from the memory in the course of performing one step. The speed of this operation is limited by the size of the computer and the rate at which its signals travel. Efforts have been made to speed up the serial computer by using light to transfer information and using optical logic elements.

One such invention by Kosonocky, U.S. Pat. No. 3,270,291, uses a saturable absorber material in a laser cavity to convert the laser into a bistable element, the two states representing the binary numbers "0" and "1". Optical input signals over a certain threshold intensity bleach the saturable absorber thus stimulating laser oscillation and its consequent intense optical emission. Such a device is said to be active since it is a source of optical energy. Typically it has an amplifying action since the output is greater than the input. However, this approach has not greatly improved computer speed because electrical signals already travel nearly as fast as light, and this device does not possess the parallel capability of the passive optical computers previously discussed.

The examples cited above illustrate the present status of the uses of optics in data processors. If a parallel computing capability is attained, the computer is passive and cannot perform a threshold operation. If a threshold action bistable output and amplification are attained, the device does not have a highly parallel action and must be used serially. The multi-mode lasers of Hardy and Pole tend to bridge this gap since they are active and have a parallel image processing capability, but their input and output are not optical beams of the same frequency and coherence (i.e., not compatible) so they cannot be linked with each other and with coherent optical computers to form optical data processing systems which perform successive stages of optical parallel processing. The Soules laser lacks a threshold action on optical beams and a bistable state of mode oscillation. This gap in optical computing components may have led some to conclude that an all optical general purpose parallel computer was not practical. See, for example, the article by W. V. Smith in *Applied Optics*, Vol. 5, No. 5, p. 1533, Oct. 1966.

In the co-pending application Ser. No. 677,391 filed Apr. 15, 1976, entitled *Multi-mode Threshold Laser*, the applicant has disclosed a new type of active bistable threshold device with a parallel processing capability. The multi-mode threshold laser can apply a threshold operation to a projected optical image (such as a coherent optical computer output image) and produce an optical output in the form of one or more laser beams, each beam corresponding to an image point above threshold. The multi-mode threshold laser has a compatible input and output and can therefore be linked with itself and with coherent optical computers to form an optical parallel computing system which can perform successive stages of optical parallel processing. Each mode of the multi-mode threshold laser acts as a (bistable) optical logic element and these elements can act simultaneously in parallel to evaluate logic functions of suitably coded optical input beams. The multi-mode threshold laser thus tends to merge the various branches of the optical computing art by providing an active parallel optical computing device capable of both image (analogical) processing and logical (digital) operations. However, the co-pending application cited above does not describe optical computing systems in which the multi-mode threshold laser is combined with either conventional linear coherent optical computers or with the improved nonlinear coherent optical (polynomial) computers previously mentioned.

The above review of the prior computing art has shown how coherent optical computers can achieve very high computing rates by parallel operation but with the limitation that only polynomial functions of the input data may be computed. Beyond this, even the simplest step such as performing a threshold operation on the output typically requires a scanning technique which is basically serial or sequential in nature. Furthermore, this scanning is electronic and the coherent optical representation of the signal is lost, slowing the operation still further if other stages of optical processing are needed. This review has also mentioned that electronic computers can compute any function but are serial in nature and therefore inherently limited in speed.

SUMMARY OF THE INVENTION

This invention combines the prior art devices, components and technology previously discussed into an optical data processing system which retains the parallel processing capability of the prior art optical computers while attaining some of the flexibility of the digital computer. In the basic form of the disclosed invention, a coherent optical computer is arranged so that its multiple outputs are injected into the modes of a multi-mode threshold laser, each separate output beam being injected into a separate mode.

A multi-mode threshold laser is a multi-mode laser with many independent modes such that each mode exhibits independent threshold action, i.e., when the cavity gain (or pumping rate) is suitably adjusted, each of the many independent modes will oscillate on the condition that the energy, or intensity, of the beam injected into that mode exceeds a threshold value. Each mode effectively has a bistable oscillation state with an output intensity determined only by the pumping rate and independent of the injected beam intensity. Methods for constructing multi-mode threshold lasers are found in the previously cited co-pending application entitled *Multi-mode Threshold Laser*. The terms "mode", "injection into a mode", "oscillation of a mode" and "independent modes" are essentially understood as in the prior art descriptions of multi-mode image amplifying and scanning lasers but are precisely defined as in the following disclosure.

A coherent optical computer is a passive optical computing device which represents numerical input data by diffractive properties of an input film, or hologram, and which represents its results by amplitudes of coherent optical (output) beams. Also the paths of radiant energy through a coherent optical computer are required to be determined, at least in part, by diffraction. Coherent optical computers, as defined in this disclosure, may (or may not) include optical components having the sole function of reshaping or redirecting its input or output beams.

Injection of the outputs of the coherent optical computer into the modes of the multi-mode threshold laser is attained by shaping the output beams so that they are the reversals of beams emitted from the modes of the multi-mode threshold laser into which the output beams are to be injected. An optical beam is said to be the reversal of a second optical beam if it has the same wave shape and general spatial location as the second optical beam but propagates in the opposite direction. Optical components which perform the reshaping necessary for injection into the multi-mode threshold laser are considered part of the coherent optical computer.

The input of the coherent optical computer is regarded as the input of the disclosed invention. The selection of the (bistable) modes of the multi-mode threshold laser which oscillate in response to injected energy is regarded as the output of the disclosed invention. The oscillation of such a mode is an indication that the corresponding coherent optical computer output exceeds a threshold value. Since the coherent optical computer outputs are formed simultaneously in parallel and the threshold actions of the multi-mode threshold laser take place simultaneously in parallel, the outputs of the basic form of the disclosed invention are computed simultaneously in parallel from its input data.

If the coherent optical computer is a spatial filter, pattern recognition may be indicated by the modes of the multi-mode threshold laser stimulated into oscillation by the brightest points of the spatial filter output image, i.e., those points with image values exceeding a threshold. When the spatial filter is a matched filter, the point of best match is obtained by increasing the gain (or pumping rate) from zero until just one mode oscillates. This mode indicates the spatial filter output point of maximum image value.

More generally, the coherent optical computer may compute linear operators on the input data, linear functionals of the input data or polynomial (discriminant) functions of the input data. Oscillation of a mode is an indication that the value of the corresponding operator, functional or function exceeds a threshold value. Or by increasing the gain from zero until just one mode oscillates, the density of the operator, functional or function with the largest value is indicated by the first oscillating mode.

If the coherent optical computer computes Boolean polynomial functions of its (binary) input data, the modes of the multi-mode threshold laser may act as active logic elements either to restore the coherent optical computer output beams to a standard (amplified) intensity, or to supplement the action of the coherent optical computer with further Boolean computations, or both.

In an improved form of the invention, one of the modes always oscillates, regardless of the input data, and supplies the coherent light source for the coherent optical computer part of the invention. The modes of the laser have thus been coupled and the amount of the coupling is functionally dependent on the input data.

Since, in the basic form of the invention, both input and output are coherent optical beams, a second stage of coherent optical recognition logic can be invoked. The same effect is achieved by feeding the output back to the input, thus achieving a second type of functionally dependent coupling. This feedback may take the form of provision of alternate input beams to the coherent optical computer which causes the coherent optical computer to compute alternate functions of the input data for a second stage of optical processing.

In the most complete form of the invention, modes of the multi-mode threshold laser are coupled holographically (or diffractively) with the amount of the coupling either a linear or nonlinear polynomial function or Boolean polynomial function of the holographic input data. The coupling functions are computed optically in parallel. A mode oscillates if the energy coupled into it from already oscillating modes exceeds a threshold value. The output is given digitally by the selection of the oscillating modes.

Two laser modes are said to be coupled if energy from one is injected into the other. The amount of the coupling is the efficiency of the energy transfer when one mode is oscillating and the other is not; i.e., the amount of the coupling is the ratio of the amplitude of the beam entering the non-oscillating mode to the amplitude of the beam emitted by the oscillating mode. The term "coupling" is to be understood essentially as in the prior art but is precisely defined as in the following disclosure.

The computing algorithm executed by this data processing system is determined by the selection of the possible coupling links which are actually established and by the amount of the coupling in each established link. These links between bistable laser modes are typically established diffractively by holograms in the coherent optical computer, and the amount of the coupling is dependent on their diffraction efficiencies. These holograms thus serve as the program for the computing system as well as its data store.

Since an arbitrary logic function may be expressed as a Boolean polynomial, the disclosed invention can numerically evaluate any function of the input data but this capability is practically useful only if the computing algorithm can be conveniently expressed in parallel form. The disclosed invention is not expected to be useful in the implementation of serial computing schemes.

This computing system may be applied to pattern recognition by calculating in parallel many discriminant functions, comparison of these values to thresholds and using additional stages of optical processing.

The disclosed invention differs from the optical computers described by Howell, Cutrona, Vander Lugt and Gamba in that these prior art devices include no multi-mode laser. The disclosed invention differs from the devices of Kosonocky in that these devices do not use holograms or diffraction. In the prior art, Pole's reactive information processing system most nearly resembles the disclosed invention, but differs from it in that Pole's system does not use the information bearing light beams to stimulate modes of the multi-mode laser into oscillation or to perturb these modes in any way. Also, the hologram is in the cavity.

BRIEF DESCRIPTION OF THE DRAWINGS

FIGS. 9, 10 and 11 show the top, front and side views respectively of a cubic cavity showing the closed path of a ray in the cavity.

FIG. 12 is a view along a diagonal of the cubic cavity showing the closed path of a ray in the cavity.

FIGS. 22 and 23 show a sample set of input data and the corresponding output display respectively for the preferred embodiment of the disclosed invention.

FIG. 24 shows a system built up from embodiments of the disclosed invention.

DETAILED DESCRIPTION OF THE INVENTION

Figure 1:
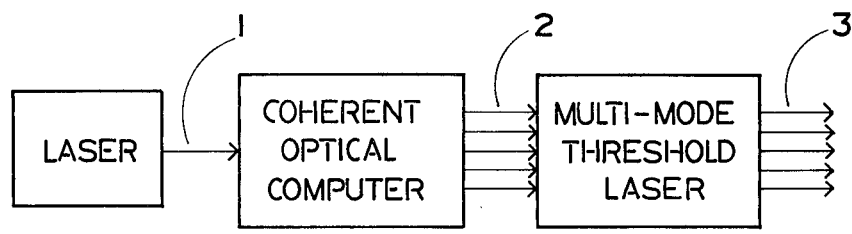
FIG. 1 shows the most elementary organizational form of the disclosed invention.

Since multi-mode lasers are an important component of this invention, their basic characteristics will be briefly reviewed in order to establish the terminology used in this disclosure. Every optically resonant cavity formed by mirrors, end reflectors and the like has many possible modes of optical oscillation, typically $10^8$ modes or more. The cavity can oscillate in any mode independently of other modes. The cavity can oscillate in any possible combination of modes and every possible oscillation is a combination of modes. In the cubic cavity formed with six equal square mirrors, each mode is a plane wave of particular orientation bouncing back and forth inside the cube.

An oscillation started in a mode will naturally decay due to loss of energy from the mode by absorption, leakage from the cavity, etc. Each mode has a loss rate associated with it and different modes will typically have different losses.

When energy leaks out of the cavity, each mode produces a characteristic distribution of energy outside the cavity. For example, if the cubic cavity has a partially reflecting wall, a mode oscillating inside the cube will cause a plane wave to emanate from this wall with a specific orientation related to the orientation of the plane wave mode inside. Similarly, if such a plane wave is incident on the partially reflecting wall, it will cause a plane wave of corresponding orientation to propagate into the cube and set up an oscillation in the corresponding mode. Radiation incident on any cavity will start oscillations in one or more modes and suitable incident optical beams will inject energy into just one mode and no others.

When an active material (lasing material) is placed in the cavity and pumped, an amplification of the oscillations occurs which may provide enough gain to compensate for the energy losses. A laser is thus obtained and the modes of the laser are those of the cavity. The most coherent light is obtained from the laser when only one mode oscillates since if two or more modes oscillate simultaneously and independently, their optical outputs are not necessarily coherent with each other. Cavities designed for typical commercial lasers which serve as sources for coherent light usually are formed to have large loss rates for all modes except one, so that only one mode oscillates at a time. However, with increasing pump power, even these cavities tend to break into multi-mode oscillation. For certain purposes such as image amplifying and optical scanning, multi-mode lasers have been found useful and, for this purpose, cavities have been designed with a very large number of similarly shaped modes of nearly equal loss rates (or equal gain). Such modes, and the cavity, are said to be degenerate. Lasers using these degenerate cavities can oscillate equally well in any of a large number of modes but only in some modes at any one time. The higher the pump power, the more modes will oscillate. This action results from the distribution of input pump energy among the modes.

When dealing with multi-mode lasers, it is convenient to group modes having the same wave shape, orientation and polarization but differing only in frequency. Each such composite mode may consist, for example, of all axial modes associated with a given transverse mode. Such a composite mode can provide one direction of a scanning beam in a scanning multi-mode laser or amplify one image point in a multi-mode image amplifying laser.

A composite mode is said to oscillate if any of its component modes oscillate. Two, or more, composite modes are said to be independent if one can oscillate without inducing oscillation in the others. The gain of a composite mode is the gain of its component mode with the largest gain. Other terminology appropriate to laser modes may be applied to composite modes with an implied definition. In the remainder of this disclosure, the term "mode" will mean composite mode unless it is specified to be an axial mode or a cavity mode. The definition of the terms "mode", "oscillation of a mode" and "independent modes" given here also applies in the *Summary of the Invention* and in the claims.

Some multi-mode cavities possess an additional property that is very useful: there is for each mode some region of space in the cavity where that mode has a high average intensity and all other modes have low intensity. The modes are then said to be spatially separated in the cavity and the cavity is said to have spatially separated modes. Such conditions arise, for example, in cubic cavities if a pair of lenses are added to focus the plane waves to a point and then reproject the point disturbance as a plane wave. Such cavities are useful because they permit the losses of the modes to be individually controlled. For example, by introducing absorption at the spatially separated points in all modes except one, oscillations in all other modes are suppressed. When a cavity having spatially separated modes is used in a laser, the laser is said to have spatially separated modes. By controlling the absorption in the region of mode separation, a multi-mode laser with spatially separated modes can be caused to emit beams in various controllable directions and thus may be useful for scanning.

A coherent optical computer is a passive optical computer which represents numerical input data analogically by difficult efficiencies of an input film or hologram and represents its computational results by amplitudes of coherent optical output beams. Typically, each beam may correspond to one point of an optical image. A diffraction efficiency of a film, or hologram, is the ratio of the amplitude of a specific diffracted beam (e.g., a plane wave traveling in a particular direction) to the amplitude of the incident beam. A diffraction efficiency is specific to the incident and diffracted beams so that different variables may be read (accessed) by different combinations of beams. Diffraction efficiency is sometimes defined as the ratios of intensities of diffracted and incident beams, and this ratio is just the square of the efficiency as defined above.

In a coherent optical computer, multiplication is performed by diffracting a beam representing the multiplier (by its amplitude) by a film, or hologram, representing the multiplicand (by a diffraction efficiency). Addition and subtraction are realized by constructive and destructive interference, respectively, of beams representing the addends. By first performing all multiplications and then performing all additions of the resulting terms by combining beams representing the terms, coherent optical computers evaluate polynomials in their input variables.

Coherent optical computers also contain a film, or hologram, which stores the coefficients of the polynomial in the same manner that the input film stores the variables. An optical input beam of standard intensity is diffracted from the input film, or hologram, and the diffracted beam is diffracted again by the coefficient film or hologram to form a term. These repeatedly diffracted beams are combined to form an output beam representing the value of the polynomial. Since a single specific optical input beam can produce many different diffracted beams (e.g., proceeding in different directions) when incident on the input and coefficient holograms, the computer may simultaneously evaluate many different polynomials each on a different output beam. Also, if an alternate specific optical input beam is furnished to the computer, different diffracted beams are produced which may multiply a given variable by different coefficients so as to evaluate alternate polynomial functions. If the input variables are restricted to the two binary values "0" and "1", Boolean polynomials may be evaluated in exactly the same way, with an output of zero amplitude representing a Boolean "0" and an output greater than a standard amplitude representing a Boolean "1". Detailed descriptions of a coherent optical computer which evaluates nonlinear polynomials is given in the previously cited co-pending application entitled *Coherent Optical Computer for Polynomial Evaluation*.

The multi-mode laser makes possible a second stage of optical processing for the coherent optical computer. Typical coherent optical computers simultaneously compute the values of many functions of their input data. For example, each output may be a different value of a cross-correlation function or each output may be a different discriminant function in pattern recognition. These output values are represented as amplitudes of coherent optical beams. Since this type of computer is passive, these output beams are quite weak and amplification is needed. The disclosed invention achieves amplification of the output by injecting each output beam separately into a predetermined mode of a multi-mode laser where it is amplified by the active material within the cavity. Also, many data processing problems require comparison of the coherent optical computer's output values to thresholds and coherent optical computers do not, in their optical parts, have this capability. The disclosed invention achieves an all-optical threshold capability by adjusting gains in each mode into which energy is injected so that these modes will oscillate if and only if the injected energy exceeds a certain threshold value.

First, the method of injecting the coherent optical computer outputs into the modes of the cavity is described. The optical frequency of the laser used in the coherent optical computer and the multi-mode laser are to be nearly the same. The shape of the output waves of the optical computer and the shape of the waves emanating from the modes of the multi-mode laser are chosen jointly so that the output beams of the coherent optical computer are the reversals of the output beams emitted by the multi-mode laser, i.e., they have the same shape but travel in opposite directions. For example, if the waves are plane waves, the reversal of a plane wave is a similarly oriented plane wave traveling in the opposite direction. Or, if the output from the laser is a diverging spherical wave diverging from point Q, then the coherent optical computer output is to be a converging spherical wave converging to point Q.

The above paragraph defines the terms "injection" and "injection into a mode" as used in this disclosure, in the *Summary of the Invention* and in the claims.

Various types of conventional optical components may be used to facilitate this injection. For example, if the outputs of the laser modes are diverging spherical waves, each mode diverging from a specific point on a plane, and the coherent optical computer has plane waves as outputs, then a lens may focus the plane waves onto the given plane, thus converting the plane waves into converging spherical waves which are suitable for injection into the laser cavity.

Difficulties may be found in producing reversed wavefronts for injection into the cavity if the waves emitted by the cavity are not of standard optical type such as plane waves, etc. Regardless of the complexity of laser beam shape, a thick hologram can be used to create the reversed wavefront. Often this hologram may be the last hologram in the optical train of the coherent optical computer so no additional hologram need be used.

Energy thus injected into a mode of the cavity will suffer the same losses as any incipient oscillation in this mode. Part of the energy will be absorbed and part will escape from the cavity. If the lasing material in the cavity is active (has been pumped), some amplification will take place and the losses will be compensated. Thus a higher optical intensity may occur in this mode than would occur in the coherent optical output itself. The multi-mode laser thus acts as an amplifier for the coherent optical computer output.

Under suitable conditions, the mode thus stimulated may begin to oscillate and cause very much more energy to be emitted from the mode than was injected into it. The conditions under which such oscillations occur in response to injected energy are quite intricate and vary greatly from laser to laser. In the disclosed invention, a saturable absorber may be placed in the cavity so as to simplify these conditions to the single condition that injected energy exceed a threshold value.

A saturable absorber is a material with an optical transmission which increases with increasing intensity of incident light, i.e., the material bleaches. When a suitably dense saturable absorber is placed in a laser cavity, the loss is more than the gain, and any incipient oscillation will be extinguished. However, if a beam of sufficient intensity is coupled into the laser, the absorber will be bleached and the gain of the laser will increase to unity so that oscillations build up. The subsequent increase in radiant energy in the cavity bleaches the saturable absorber further and reinforces the state of oscillation. The minimum intensity necessary to start this buildup provides the threshold capability mentioned above. Because the incoming radiation acts directly on the saturable absorber which in turn controls the oscillation of the laser, this threshold action is independent of the exact interrelation of the injected radiation and the natural cavity oscillation. For example, they need not be of exactly the same frequency although such frequencies should be made as close as possible. This requirement is satisfied by using a laser of the same type of active material to generate the injected radiation.

The use of saturable absorbers in single mode lasers to achieve threshold discrimination has been described by W. Kosonocky, U.S. Pat. No. 3,270,291. The disclosed invention applies this technology to multi-mode lasers. In multi-mode lasers, the saturable absorber is placed in the regions in which the modes are spatially separated. For example, in the cubic cavity with a pair of lenses, the saturable absorber is placed in the common focal plane. Thus, incoming radiation that is injected into just one mode bleaches only the saturable absorber in the region of space characteristic of that one mode so that it controls the oscillation of just that one mode. When thus provided with saturable absorber in the spatially separated regions, the multi-mode laser becomes a multi-mode threshold laser.

When the bleaching radiation is withdrawn from the saturable absorber, it tends to regain its absorption. The time interval in which the saturable absorber regains most of its attenuation (about 63%) is called its recovery time.

The thresholds in the modes can be jointly adjusted by uniformly changing initial density of the saturable absorber or by changing the gain in the laser cavity through changes in the pumping rate. The thresholds of the various modes can be separately adjusted by placing permanent (non-saturable) absorbing material in the spatially separated parts of the modes. The amount of attenuation in each mode is chosen so as to equalize the gain in the modes. When the modes have been thus rendered degenerate, the threshold will be the same in each mode (provided that the amount of saturable absorber is the same in each mode). This uniform threshold will hold even if the modes have axial modes of different frequency (so that no one input frequency could match all modes) since the saturable absorber, which controls the oscillation, absorbs uniformly over the laser line width. Different (predetermined, controllable) thresholds in various modes can be obtained by different amounts of (extracavity) attenuation in the various input signals or by adjusting the scale factor on the output beams of the coherent optical computer.

In any laser, radiation in an oscillating mode soon depletes the inversion (amplification) to such an extent that the over-all cavity gain (including decoupling loss) becomes very nearly unity. If the gain was less, the oscillations would be extinguished. If the gain was more than unity, the oscillations would increase in intensity without limit. In a homogeneously broadened multi-mode laser with degenerate modes, all modes must have nearly the same gain as oscillating modes, since they have nearly the same geometry relative to the active element. If a saturable absorber is added to the cavity, the gain will at first increase (after onset of oscillations) due to bleaching of the saturable absorption by mode radiation. Shortly after a mode begins to oscillate, the optical density of the saturable absorber in that mode will be reduced to near zero by mode radiation. The gain in the active element will then be reduced by depletion of inversion so that over-all cavity gain decreases to near unity. The transparent state of the saturable absorber will nevertheless latch the mode into oscillation as long as pumping rate does not decrease (and provided the saturable absorber does not regain its absorption in intervals between relaxation pulses, i.e., its recovery time is greater than the relaxation period). It follows that the state of oscillation of each mode is bistable. Also the oscillating modes have equal power output since they are degenerate. No computational information is available from the intensity of mode oscillation and the output of a multi-mode threshold laser is significant only with regard to the selection of its oscillating modes. The radiation emitted from oscillating modes may thus provide a fixed value indicator of threshold crossing or a representation of Boolean variables.

The transparent state of the saturable absorber will persist, due to mode radiation, even after the input signal has been withdrawn. Thus a mode can be triggered either by a steady beam of fixed intensity or by a pulse of sufficient energy. The thresholds of the modes may be expressed in terms of either an intensity or an energy or in other ways depending on the time varying nature of the input signal.

The oscillation of the modes of a multi-mode threshold laser cannot be individually quenched. As soon as all modes have oscillated which have inputs above threshold, no further computationally significant action takes place until all modes are simultaneously quenched by reducing laser gain or pumping rate. In the disclosed invention, the computing action proceeds in a series of cycles. At the beginning of each cycle, no modes are oscillating. The maturity of the cycle is marked by the selection of modes oscillating in response to injected energy, after which all modes are quenched to restore the initial state.

In a multi-mode threshold laser, the gain of non-oscillating modes will be nearly unity except for the saturable absorber, i.e., it will be unity less the amount of the saturable absorption. This follows since amplification and losses must be the same as for oscillating modes which have nearly unit gain and in which the saturable absorber is bleached. Consequently, thresholds can be roughly calculated on the assumption of unit gain in the cavity except for saturable absorption. An optical signal which bleaches the saturable absorber to transparency will then release the mode. Formulae given by Ross (op. cit.) for the absorbed intensity (or energy) necessary to reduce the saturable absorber to transparency are equivalent to approximate formulae for the threshold intensity (or energy).

However, the exact threshold will depend on other factors including the number of oscillating modes. Consequently, exact threshold values are obtained empirically by joint adjustments of initial saturable absorber density and pumping rate. These adjustments can be facilitated, and effectively performed during the computation, by setting aside one or more modes which do not participate in the computation but which are provided with a separate source of injected energy. These modes, called control modes, may have a fixed input intensity equal to the desired threshold intensity (for the steady state case). Then as cavity gain is increased from zero, oscillation of the control modes indicates that the correct threshold gain has been obtained. Preferably this adjustment should be performed during the computing cycle (so that the number of oscillating modes is properly accounted for). Then oscillation of the control modes indicates that the computing cycle should be terminated.

The use of control modes to obtain an exact threshold is particularly advantageous in pulsed laser embodiments where the optical input beam to the coherent optical computer necessarily varies in intensity. One method of getting a predetermined threshold in the pulsed case is to refer all values to the peak pumping rate (or peak laser gain) and proceed as in the steady state case with an effective termination of the computing cycle as soon as gain starts to decrease. In another approach, use is made of the fact that the intensity (or amplitude) of the optical computer output beams is proportional to the intensity (or amplitude) of its optical input beam. The proportionality constant for a particular beam is the function computed by that beam (except for a mathematical scale factor). In other words, the input-output efficiency of the coherent optical computer represents the computed value. A particular coupling efficiency thus corresponds to the threshold value. When the control mode is coupled to the same source (which furnishes the optical input beam to the coherent optical computer) with the desired threshold efficiency, its oscillation will serve to indicate that all modes having input values above threshold have already oscillated just as in the steady state case. The computing cycle is then to be terminated. In both cases, the cycle is terminated by reducing gain or by any method which prevents any other (indicator) modes from emitting radiation. For example, use of a large number of control modes could take up all excess inversion energy.

To prevent giant pulses from forming in the multi-mode threshold laser, the initial density of the saturable absorber should be quite low, typically about 2%. It may appear that this low density would lead to a low efficiency of absorption of input signal radiation. However, if the input is injected into a mode as previously described, the efficiency is very high. Usually the multi-mode laser will be operated with total (loop) cavity gain in non-oscillating modes nearly equal to unity except for the saturable absorption. Then radiation injected into a non-oscillating mode will be absorbed (over one cavity loop, i.e., on balance) only in the saturable absorber, yielding a 100% input absorption efficiency. Energy lost otherwise is made up to the cavity (and to the saturable absorber) by the amplification of the active material. Cavity amplification thus increases sensitivity to optical input signals but it does not increase the effective signal-to-noise ratio since the fluorescent radiation of the active material (the principal source of noise) is amplified in exactly the same way. Detailed information on the construction and operation of a multi-mode threshold laser and on methods of injecting optical radiation into its modes will be found in the co-pending application previously cited entitled *Multi-mode Threshold Laser*.

The coherent optical computer represents an output value in terms of the amplitude of an output beam. When the output value is constrained to be a positive real number, there is a specific one-to-one relation between the number value and beam intensity so that output above a certain threshold value corresponds to beam intensity above a certain threshold intensity. Thus when the computer output beam is injected into a mode of a multi-mode threshold laser, an output value above a certain threshold value will stimulate that mode into oscillation and an output below threshold value will not.

The output values of a coherent optical computer are represented by complex amplitudes of coherent optical radiation. These complex amplitudes most naturally represent complex numbers. The output can represent real polynomials and real linear functions provided that the input variables and coefficients are such as to produce a real number result.

For the complex number outputs, the threshold applies to the modulus of the complex number. In the case of real valued outputs, the threshold applies to the absolute value. Although this is generally in accord with the requirements of threshold action in pattern recognition, care must be taken to be sure the threshold is not triggered by an unexpected large negative result.

If the output beams of the coherent optical computer represent Boolean variables, the threshold is set to distinguish the two values "0" and "1". Boolean numbers may be represented optically in a variety of ways. One method is to represent a Boolean "1" by an optical beam of amplitude equal to or greater than a standard amplitude and a Boolean "0" by a beam of zero intensity. This representation arises naturally in evaluating Boolean polynomials by coherent optical computers in which all products are evaluated by diffracting optical beams (multiplying by "1" corresponds to maximum diffraction and multiplying by "0" corresponds to zero diffraction), and all sums are evaluated by combining beams representing the terms. If more than one term is unity, the combined beam is necessarily greater than standard amplitude. When such a combined beam is injected into a mode of a multi-mode threshold laser, with threshold set at ½ the intensity corresponding to standard amplitude, the mode will oscillate on the condition that the injected beam is greater than standard intensity, i.e., if and only if the Boolean sum is unity. Since the intensity of the mode oscillation is the same, regardless of the value of the input signal, the output of that mode represents the unit value at a standard intensity (or amplitude) so that it may be used in a second stage of optical processing. That is, the multi-mode threshold laser restores the optical computer output to a definite value and acts as a readout device. Of course, the standard amplitude of the output need not be the same as the standard of the input and will usually be greater.

In another representation, a Boolean "0" is represented as above but a Boolean "1" is represented by a beam of standard intensity (i.e., not appreciably greater than standard except for small random fluctuations). This representation arises naturally in using the multi-mode threshold laser as a collection of logic elements since with this representation either sums or products of optically represented variables are easily formed by combining beams representing these variables and injecting these combined beams into a mode of the multi-mode threshold laser with appropriately set threshold. For the sum, this threshold is set at ½ standard intensity. When applied to summing the terms of a polynomial where the products are formed in a passive optical computer, this is the same physical arrangement and threshold as described for reading out the sum as formed in the representation mentioned in the previous paragraph. The only difference is that here the sum is interpreted as formed in the multi-mode threshold laser rather than in the combined beam. In this viewpoint, the action of the optical computer is to simultaneously form all products (terms) while the multi-mode threshold laser simultaneously forms all sums.

The latter representation is used in the co-pending application previously cited entitled *Multi-mode Threshold Laser*. The two representations may be used interchangeably as far as polynomial evaluation is concerned, but the terminology of the former will be used in this disclosure. The terms of the polynomial could be formed in another multi-mode threshold laser (as described in that copending application) but use of the optical computer overcomes the difficulty of accurately setting thresholds used in forming products of many factors.

A combination of a coherent optical computer, its laser source, and a multi-mode threshold laser is shown schematically in FIG. 1. The laser supplies an optical input beam, denoted 1 in the figure, to the coherent optical computer. The numerous coherent optical computer output beams, 2, are injected into modes of the multi-mode threshold laser, each beam into a different mode. The multi-mode threshold laser realizes a threshold action on each of the outputs, 2, simultaneously. The threshold crossing is indicated by the oscillation of the associated mode which causes coherent optical beams, 3, to be emitted from the multi-mode laser, each beam being of a shape or direction characteristic of a particular mode. Each threshold indication is provided in a coherent optical form in parallel from the coherent optical computer input without any scanning or sequential action. The combination of the coherent optical computer and the multi-mode threshold laser, as shown in FIG. 1, is the basic form of the disclosed invention. The input of the computer, or computing system, shown in FIG. 1, is the input of the coherent optical computer (typically a hologram) and the output is the selection of the modes of the multi-mode threshold laser which oscillate as indicated physically by radiation emitted from the multi-mode laser. The beams linking the coherent optical computer to the multi-mode laser may be amplified, if necessary, by conventional laser amplifiers or image amplifiers provided each beam is amplified independently without crosstalk between separate beams and each beam is amplified in a predetermined amount. This amplification may be considered as an inverse attenuation or compensation for any attenuation that may occur in the passage of optical beams from the coherent optical computer to the multi-mode threshold laser and hence is not shown in the figures or further mentioned explicitly.

In addition to providing a comparison to a predetermined threshold value, the multi-mode threshold laser can indicate the identity of the largest of the outputs, 2, of the coherent optical computer. This operation is performed by comparing the output values to a series of decreasing thresholds, at first so high that no output exceeds the threshold, then steadily lower until one output exceeds the threshold. The first to exceed the lowering threshold is the largest. The decreasing threshold is achieved by increasing the gain or pump power of the multi-mode threshold laser. First, the gain is decreased until no mode oscillates. Then as gain increases, some one mode will be the first to oscillate. This mode corresponds to the coherent optical computer output beam, 2, with the largest output value. Further increases in gain will identify the next largest, etc., if that information is desired.

One laser mode is said to be coupled to another if energy from one is injected into the other. The term "mode" refers here to composite mode and "injection" refers to injection into a composite mode as previously defined. The amount of the coupling is the efficiency of the energy transfer when one mode is oscillating and the other is not, i.e., it is equal to the ratio of the amplitude of the beam entering the non-oscillating mode to the amplitude of the beam emitted by the oscillating mode. Thus in FIG. 1, the coherent optical computer couples a mode of the laser (shown on the left) to modes of the multi-mode threshold laser. The amount (or efficiency) of the coupling into a given mode of the multi-mode threshold laser is a function of the input data of the coherent optical computer. This is just the function evaluated by the coherent optical and represented by the amplitude of its output beam injected into that mode. More generally, the two modes coupled may belong to the same laser. The presence of the saturable absorber in the multi-mode threshold laser makes practical the control of oscillation of one mode by energy coupled from another just as it makes practical control of oscillation of a mode by injected energy. Specifically the saturable absorber insures that the coupling efficiency is independent of exact frequencies of the axial modes of the two (composite) modes being coupled.

The above paragraph defines the terms "coupling" and "coupling of laser modes" as used in this disclosure, in the *Summary of the Invention* and in the claims.

Figure 2:
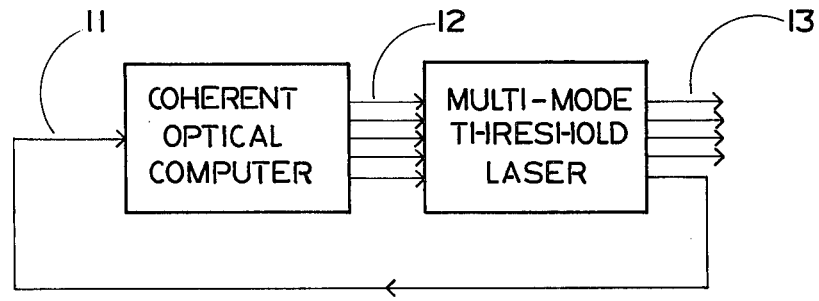
FIG. 2 shows a more advanced organizational form of the disclosed invention.

Rather than have a separate laser to provide the optical input beam for the coherent optical computer, as shown in FIG. 1, the multi-mode threshold laser can supply such input radiation from the output radiation of one of its modes as shown schematically in FIG. 2. In this figure, the optical input beam to the coherent optical computer is denoted 11, the coherent optical computer output beams are denoted 12, and the multi-mode laser outputs (except for beam 11) are denoted 13. The mode supplying the optical input beam 11 is distinguished from other modes by removing the saturable absorber from its characteristic mode volume so that this mode always oscillates independently of the values of the coherent optical computer outputs. If the coherent optical computer requires more than one optical input beam, several modes of the multi-mode laser can be assigned to this task, each mode supplying a distinguishable input beam. These modes are called the base modes. They are coupled to the coherent optical computer by the same general procedures as used for injection of beams into the multi-mode threshold laser. FIG. 2 may be considered as a schematic representation of an improved form of the disclosed invention.

Figure 3:
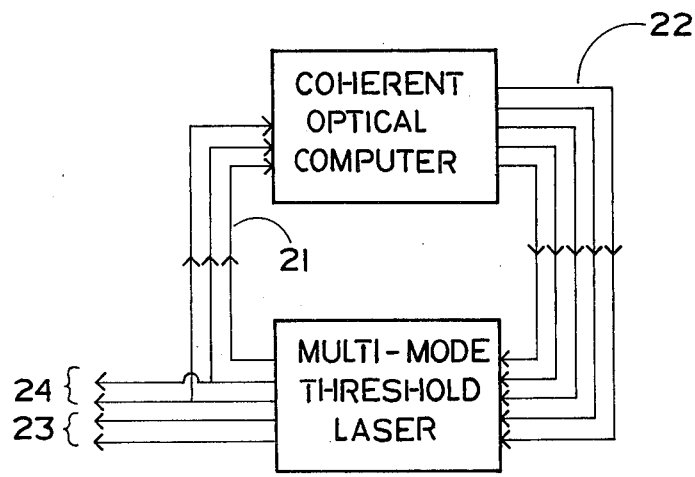
FIG. 3 shows the most complete organizational form of the disclosed invention.

In previous paragraphs, the combination shown in FIG. 2 has been described as a means of providing an amplifying and threshold action on the outputs of the coherent optical computer. From another point of view, the arrangement of FIG. 2 can be said to couple the base mode or modes of the multi-mode threshold laser to its other modes in such a way that the amount of the coupling is a function of the input data of the coherent optical computer. Those modes which have high coupling to the base modes will oscillate, while those with low or zero coupling will not. This coupling can be carried further. If some of the output beams of the multi-mode laser which indicate threshold crossings are fed back to the coherent optical computer, they can serve as alternate optical input beams to the coherent optical computer which may cause the computer to compute alternate functions of its input data. Thus, the modes which give rise to these laser output beams can be considered to be coupled to still other modes. In this way, a network of coupling between laser modes is achieved in which the amount of the coupling depends on holographically presented input variables. This coupling is illustrated schematically in FIG. 3 in which the coherent optical computer output beams 22 are injected into the modes of the multi-mode threshold laser as before. The output beams of the multi-mode threshold laser are grouped into three classes. The first class is the base modes, denoted 21, which serve only as an input to the coherent optical computer. The second class, 24, contains those beams which serve both as threshold indicators and as optical computer input beams. For this class, the output beams of the laser may be divided by beam splitters or two separate portions may be obtained from separate laser exits. The third class of laser output beams, denoted 23 in FIG. 3, serve only as threshold indicators. FIG. 3 may be considered as a schematic representation of the most complete organizational form of the disclosed invention.

Each mode of the multi-mode laser acts in certain respects as an individual laser with a saturable absorber present in it to cause it to behave as a logic element as taught by Kosonocky. The multi-mode threshold laser is essentially a collection of a very large number of such logic elements which occur naturally as modes of a cavity and need not be individually produced or handled. Also as lasers, they are simultaneously pumped by a single pumping source. In this sense, the multi-mode threshold laser is almost a computer in itself. From this (laser) point of view, what is accomplished in FIG. 3 is to couple the modes (logic elements) of the laser in such a way that the amount of the coupling is a polynomial function of the input data. Furthermore, this coupling function can be made quite complex by taking advantage of the very high data storage capacity of holograms used in the coherent optical computer and also the coupling can be very fast in view of the parallel action of the coherent optical computer.

From the point of view of the coherent optical computer, what is accomplished in FIG. 3 is the provision of a feedback capability with amplification and threshold action. The active medium of the multi-mode threshold laser provides the amplification while the threshold action is enforced by the saturable absorber. Also, the laser accentuates and amplifies the effect of the light on the saturable absorber.

Thus, each of the two principal parts of the disclosed invention shown schematically in FIG. 3 provides a capability needed but not possessed by the other. This disclosure may be said to show how the multi-mode threshold laser and the coherent optical computer can complement each other when combined, as described above, into the disclosed invention.

The input of this data processing system is determined by the diffractively established coupling links between bistable laser modes (logic elements). Typically, these links are realized physically by holograms in a coherent optical computer. This coupling has two aspects. One, a digital aspect, is the selection of the possible links actually established. The other, an analog aspect, is the amount of the coupling in each link. The former qualitatively determines the computing algorithm, whereas the latter quantitatively determines the computing algorithm (e.g., coefficients of polynomials and linear forms) and also specifies the input data. Usually the input data are recorded in a separate easily changed, or removable, hologram (input hologram). Thus holograms in the coherent optical computer serve as the memory of the computing system since they store both the data and the program. This is a "read only" memory since it is not altered by computing action in any way. In a parallel computing scheme, lack of ability to alter the program on the basis of intermediate results is not a disadvantage since all results are obtained essentially simultaneously. To the extent that successive stages of optical parallel processing represent a rudimentary serial action, the provision of alternate optical input beams to the coherent optical computer can effect program branching as described below, and the subset of modes which may be caused to oscillate in a given stage acts as a "scratch-pad" memory in which results of that stage are recorded.

On comparison of FIGS. 1, 2 and 3, it is evident that the configuration of FIG. 1 is contained in the other two figures with the multi-mode threshold laser playing the two roles of laser source and laser readout device. The disclosed invention could have been defined as only the configuration of FIG. 1 and the other two figures omitted. From this viewpoint, most practical applications would probably require a network of FIG. 1 configurations, i.e., a net of "combinations of a coherent optical computer with a multi-mode threshold laser". Specifically, the laser shown to the left in FIG. 1 could be a multi-mode threshold laser. In this scheme, or network, the input radiation to a coherent optical computer would be provided by an adjacent multi-mode threshold laser, and this input beam could be used as an alternate information input additional to the hologram of that coherent optical computer. However, the greater computing power of this network is obtained, as shown in FIGS. 2 and 3, without additional major system components. Therefore, it seems desirable to describe these more complex configurations separately. Equivalently, FIG. 1 could be considered as a special case of mode coupling in which the (source) laser is coupled to a mode of the multi-mode threshold laser.

The generality of the computing capability of the disclosed invention is most easily verified in the Boolean case. Since any Boolean function can be expressed as a polynomial (e.g., disjunctive normal form), any logic function can, in theory, be calculated by a coherent optical computer as disclosed in the previously cited co-pending application entitled *Coherent Optical Computer for Polynomial Evaluation*. However, this capability is practically useful only if the function can be expressed as a polynomial of suitably low degree (usually less than 10). This is equivalent to saying it has a practical expression in parallel form. The basic configuration of FIG. 1 permits evaluation of polynomials of higher degree by a second stage of optical processing using an optical output beam of the multi-mode threshold laser as an input to a second optical processing stage. The function represented by this beam acts as a multiplier (factor) on any Boolean polynomial which the beam subsequently evaluates as input to a coherent optical computer. Additional stages could be implemented by networks of FIG. 1 configurations, or, more elegantly, by the configuration of FIG. 3 in which no other lasers need be provided.

In the case of real and complex variables, the polynomials calculated by the coherent optical computer may be used to approximate any continuous function of its input variables, including the case of many variables, each variable corresponding to an image point. The uses of polynomials (truncated power series) as numerical approximating functions is well known in computer science. This capability is limited in practice by the (possibly) high degree of the required approximating polynomial. Although most functions can be approximated over a limited range by a polynomial of low degree (e.g., linear approximations), the error in the approximation for the largest practical degree may become large as the range of the input variables is extended. This difficulty can be obviated by using a hybrid computing scheme with a second stage of optical processing as described below.

In a hybrid computing scheme, some optical beams represent real or complex variables while other beams, or modes, represent Boolean variables. One example of this concept is approximation by piecewise polynomial functions. In this approach, the first processing stage tests the range of the variables and produces a separate output for each of several intervals. These outputs then serve as input beams (for the coherent optical computer) which evaluate different polynomials each pertinent to its input variable range and each approximating the desired output function on that range. In the simplest case of one variable piecewise linear approximation, the desired function is approximated by straight line segments. Although discontinuous functions are numerically difficult to approximate by a single polynomial, most functions of practical importance can be well approximated by low degree polynomial segments with interval boundary at the discontinuities. In the one dimensional case, the intervals may be defined by the condition that $x$ be greater than a constant, e.g., 4. The boundary of the interval is then an equation $x = 4$. A set of data input values is determined relative to this boundary by comparison of $x$ to the fixed value 4, i.e., by comparison of the linear form $x$ to a threshold of 4. The first stage of optical processing can thus determine the location of the data relative to the boundary $x = 4$ by a threshold operation. In the two variable case, the boundaries can be linear forms such as $2x + y$ or polynomials such as $x^2 + y^2 - 9$ can be used to define curved boundaries. Thus comparison of $x^2 + y^2 - 4$ to a threshold 5 can give an optical beam that can be used to approximate another function of $x$ and $y$ outside of a circle of radius 3 centered at the origin. Similarly, comparison of $33 - x^2 - y^2$ to a threshold 24 can give an optical beam that can be used to calculate a different approximating polynomial on the inside of that circle (provided the values of x and y are positive and less than 5). In the general (many) variable case, the intervals can correspond to extremely diverse shapes in multi-dimensional space such as long thin tubes not necessarily localized in the Euclidean metric.

A finite interval such as x less than 4 and greater than 2 can be indicated by two successive stages of processing. The first selects the region less than 4 comparing 8 − x to 4 in mode $M_1$. The output beam from mode $M_1$ evaluates $x + 2$ and this is compared to a threshold 4 by mode $M_2$. An output from mode $M_2$ then evaluates the polynomial appropriate to that finite interval. Alternately, the polynomial $$(4 - x(x + 2)) + 4 = -x^2 + 6x - 4$$

can be compared to a threshold 4 to give an output beam if and only if x lies in that same finite interval and this beam is produced in only a single stage of processing.

In another example of a hybrid computing scheme, several real or complex valued functions of the input variables are computed and compared to threshold values. A set, S, of Boolean variables is defined one for each such function. These Boolean variables are defined to have the value unity if and only if the corresponding function crosses its threshold. Various logical deductions may then be made concerning the status of the situation portrayed by the input variables. These deductions may be implemented by a second stage of optical processing. Products of the (computed) Boolean S variables with variables holographically encoded in the coherent optical computer may be formed by using the laser output beam (representing an S variable) as an input beam for the coherent optical computer which is incident on its input hologram to form a product, or (more generally) to evaluate a polynomial having the Boolean S variable as a factor. Sums of the Boolean S variables cannot be evaluated in the coherent optical computer since their source modes are not necessarily coherent with each other. Boolean sums and products of the (computed) Boolean S variables with each other may be formed in a multi-mode threshold laser as described in the co-pending application previously cited entitled *Multi-mode Threshold Laser*. However, the coherent optical computer can be used for directing and combining beams for injection into modes of the multi-mode threshold laser where they ae added and multiplied.

The previous five paragraphs are to be considered as a mathematical description of utility (and not as a description) of the disclosed invention. An area of practical utility, or application, is pattern recognition. In the basic organizational form of the invention shown in FIG. 1 and in the improved form with base modes shown in FIG. 2, the coherent optical computer can compute correlation functions of the input, spatially filtered versions of an input image or matched filter output images. The multi-mode threshold laser can perform threshold operations on these outputs to indicate patterns or features in the images, as shown by Vander Lugt (op. cit.), or can find the maximum point of the matched filter output indicating the point of best match. These threshold operations are performed in parallel simultaneously on each image point and not serially by image scanning as in the prior art. Further, the output of the threshold operation is also a coherent optical beam and so may be used to implement a second stage of recognition logic.

Second stages of optical processing can be performed by systems of the arrangements shown in FIG. 1 or more expediently by the complete form shown in FIG. 3. The coherent optical computer can compute many discriminant functions of its input image or input data and the multi-mode threshold laser can determine which of these functions exceed threshold values to indicate features or patterns in the input. These discriminant functions can be piecewise linear or polynomial functions of the input data. Or the second stage of processing can be interpreted as preliminary logical processing.

For example, suppose the coherent optical computer is used for feature extraction in a pattern recognition application and output $O_1$ is coupled to mode $M_1$ of the multi-mode threshold laser. Values of $O_1$ exceeding a certain threshold occur when feature $F_1$ is present in the input. This feature is then indicated by oscillation of $M_1$. Similarly, a second feature $F_2$ could be easily tested. However, a third feature $F_3$ is the most pertinent to the pattern analysis and is very difficult to extract directly but is logically equivalent to the simultaneous occurrence of $F_1$ and $F_2$. Then the output of mode $M_1$ is fed back to the coherent optical computer and used as an optical input beam which causes a discriminant function for $F_2$ to be computed and realized on output beam $O_2$. This output beam is then coupled to mode $M_3$ of the multi-mode laser. Thus, the stimulation of $M_3$ will occur only if $M_1$ oscillated and $F_2$ was indicated on $O_2$, so $M_3$ is an indicator for $F_3$. In this example, the features $F_1$ and $F_2$ can be said to denote Boolean variables represented by modes $M_1$ and $M_2$ and since the amplitude (or intensities) of beams $O_1$, $O_2$ and $O_3$ are computed analogically, this example shows the natural hybrid character of the disclosed computing system.

When piecewise linear functions or piecewise polynomial functions are used to approximate discriminant functions, the intervals on which such an approximant is equal to a single polynomial can correspond to sophisticated properties of input data such as choice of type font in character recognition. In this case, the interval boundaries are determined by other discriminant functions designed to measure the interval defining features.

The previous paragraphs show how the combination of a passive coherent optical computer and a multi-mode threshold laser can be used to perform computing tasks beyond the reach of either. The simultaneous parallel evaluation of many piecewise linear discriminant functions could not be carried out by prior art coherent optical computers because such computers could evaluate only a predetermined function of the input data and are not able to select (in an all optical parallel operation) the linear discriminant function appropriate to the input data. Nor could a collection of logic elements organized in the conventional serial computing schemes carry out such computing operations in parallel. The evaluation of piecewise linear functions would normally be carried out serially by a digital computer. The disclosed laser holographic data processing system has therefore extended the parallel processing capability of coherent optical computers to include some of the capability reserved, until now, to serial digital computers.

Some remarks on the sequence of action in this computing system should also be included here. The disclosed invention as shown in FIG. 1 is essentially static in nature in the sense that once the coherent optical computer is provided with input data and the pump power is fixed, a final pattern of mode oscillation is soon established in a time depending mainly on the rapidity of saturable absorber bleaching. The selection of the modes which oscillate in this pattern provides the output of the disclosed optical computing system invention. Since each mode either oscillates or not, the output is essentially digital but the computing system is not serial because there is no further action beyond this one selection of oscillating modes which is computed in parallel from the input data. In this computing system, the pattern of mode selection is only changed by increasing pump power and decreasing threshold so that more modes oscillate. Mode oscillations are never individually turned off. When the mode oscillation pattern is established, the computing cycle is complete, the pump power is turned off, and new input data are provided to the coherent optical oomputer in preparation for a new computing cycle. The static nature of the disclosed invention is in harmony with, and is an extension of, the static nature of coherent optical computers and of multi-mode threshold lasers.

The static nature of the coherent optical computer and the multi-mode threshold laser is closely connected with their parallel computing action. Each point of the output image of the coherent optical computer is formed simultaneously and essentially instantaneously and the output is not changed (remains static) until the input data is changed. No output point needs to be changed in response to others because each output intensity is computed independently directly from the input data, i.e., in parallel. The pattern of mode oscillation of the multi-mode threshold laser is also static once it is established as explained in the co-pending application previously cited entitled *Multi-mode Threshold Laser.*

As explained in that co-pending application, the fact that the modes of the multi-mode threshold laser cannot be individually quenched precludes the use of its modes as the collection of logic elements forming a serial computer since in a serial computing scheme each logic element must always be able to change its state (for any initial state) in response to a suitable input signal. However, the "one-way" action of the modes of the multi-mode threshold laser acting as logic elements is not a disadvantage in a parallel computing scheme in which the final state of each element is evaluated directly from the input data without reference to the states of other logic elements. The concept of expressing this final state in terms of a polynomial function of the input data furnishes a theoretically complete mathematical framework for a parallel computing scheme fully in harmony with the ability of coherent optical computers to virtually instantaneously evaluate a large number of such polynomial functions, in parallel, by passively transmitting optical beams.

Although successive stages of parallel processing (as obtained in networks of basic FIG. 1 configurations or in FIG. 3 organizations) provide some serial capability, the disclosed data processor is still essentially parallel. It may have, typically, millions of distinct parallel channels and up to 10 serial steps (stages). This is in contrast to a von Neumann type serial computer with only about 100 parallel channels (e.g., a 36 bit counter) and typically millions of serial steps in any significant computation.

DESCRIPTION OF A SPECIFIC EMBODIMENT.

Figure 4:
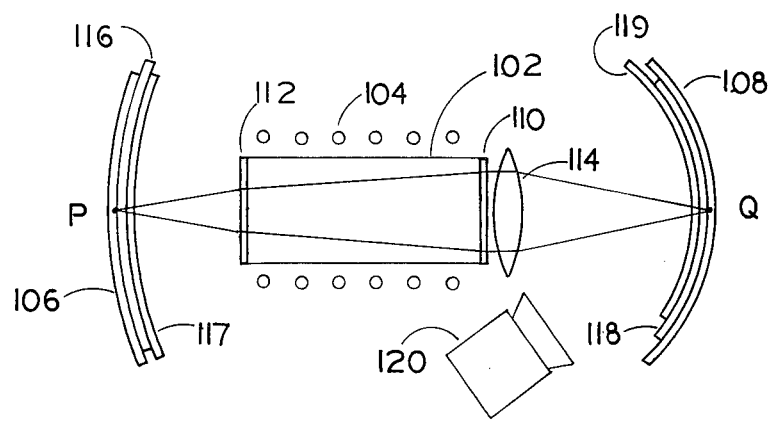
FIG. 4 shows an embodiment of a multi-mode threshold laser.

In this embodiment, the cavity will be that used by Hardy in U.S. Pat. No. 3,203,565. This multi-mode laser, intended as an image amplifier, is shown in FIG. 4 just as presented by Hardy. The laser 102 uses a He - Ne mixture pumped by means 104 and has anti-reflective coatings 110 and 112. Lens 114 images mirror 106 on mirror 108 as shown for points P and Q. A typical mode has the form of a wave diverging from a point on 106 such as P and converging to a point on 108 such as Q. Each mirror should have some transmission so energy can exit and enter the cavity at either end. The only modification is that mask 116 has variable attenuation to equalize gain in the modes and is covered with anti-reflective coating 117. Added to the cavity is a saturable absorber film 118 provided with an anti-reflective cover 119. These latter anti-reflective coatings may be mounted on a "contact lens" which fits the curved surfaces of mirrors 106 and 108. The saturable absorber is photochromic material type 43-540, manufactured by American Cyanamid. This is bleached by He - Ne laser light and darkened by longwave ultraviolet light. A source of ultraviolet light 120 is provided for darkening the saturable absorber. This source must illuminate film 118 uniformly and be of adjustable intensity. FIG. 4 thus comprises a multi-mode threshold laser.

The specific calculation which this embodiment is to perform is as follows. The input data are two real variables, $x$ and $y$, normalized to the range $-1$ to $+1$. The computing system is to evaluate the function $f(x,y)$ where $$f(x,y) = x + 0.5y \text{ for } x \text{ positive,}$$

and $$f(x,y) = -x + 0.5y \text{ for } x \text{ negative}$$

and to provide an output indication whenever the absolute value of $f(x,y)$ is greater than 3/5. Note that $f(x,y)$ is not a polynomial function of $x,y$ so it cannot be directly calculated by a coherent optical computer but it is equal to a polynomial over each range of $x$; hence, it can be represented by a coherent optical computer output if alternate optical input beams are provided corresponding to the two ranges of $x$.

Four laser modes are used in this embodiment and are listed in table I. Each mode corresponds to a "point" or small circular area of high transmission on mask 116 and also to the corresponding areas on film 118 as projected by lens 114. All saturable absorber is removed from the circular area on film 118 corresponding to $M_o$, the base mode.

TABLE I

| Mode | Indicates | Input Beam | Input Value | Threshold Value |
|---|---|---|---|---|
| $M_0$ | Base | | | 0 |
| $M_1$ | x Negative | $A_1$ | $1 - x$ | 1 |
| $M_2$ | x Positive | $A_2$ | $1 + x$ | 1 |
| $M_3$ | f(x,y) greater than the threshold value | $A_3$ | f(x,y) | .6 |

The laser is pumped so that $M_o$ oscillates. Energy from $M_o$ causes the coherent optical computer to compute $1 - x$ and $1 + x$ on beams $A_1$ and $A_2$ respectively which are injected into modes $M_1$ and $M_2$ respectively.

The common threshold value of $A_1$ and $A_2$ is adjusted so that modes $M_1$ and $M_2$ will oscillate when the input value exceeds 1. Thus, $M_1$ will oscillate if $x$ is negative and $M_2$ will oscillate if $x$ is positive. Since oscillation of either mode will drain off some pump power and reduce the threshold slightly, only one mode will oscillate even though $x = 0$ exactly. Also the modes $M_1$ and $M_2$ may be adjusted to have the same frequency by tilting mirrors 106 and 108. This will insure that only one of these modes oscillate at any one time.

The output of Mode $M_1$ is directed to the coherent optical computer and causes it to compute the function $x + 0.5y$ and represent the result by the amplitude of beam $A_3$. Similarly, the output of mode $M_2$ is directed to the coherent optical computer and causes it to compute the function $-x + 0.5y$ and represent the result by the amplitude of beam $A_3$. Since either $M_1$ or $M_2$ will oscillate, but not both, beam $A_3$ will represent either $x + 0.5y$ or $-x + 0.5y$ according to whether $x$ is positive or negative, and hence represents the function $f(x,y)$ for all $x$ values.

The beam $A_3$ is injected into mode $M_3$ and its threshold is adjusted so that $M_3$ will oscillate if the value represented by $A_3$ exceeds .6 in magnitude. This is the desired output indication.

The threshold of the laser will depend on both the pumping rate and the intensity of the darkening ultraviolet light illuminating the photochromic film. The adjustments are made as follows. The saturable absorber is removed from the cavity and a filter having a transmission of 0.99 in the laser light is inserted into the laser cavity. The pump rate is increased until the laser just oscillates. This is the desired pump rate. The filter is removed and the saturable absorber is replaced.

Figure 5:
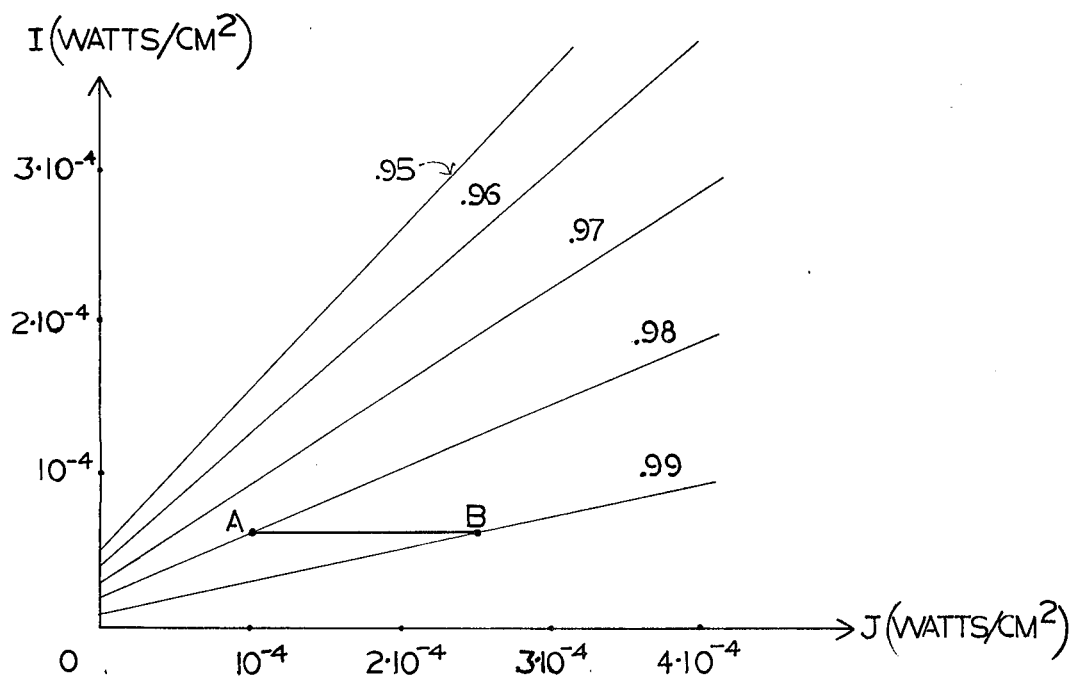
FIG. 5 shows a typical relationship between the saturable absorber transmission, the irradiance of bleaching laser radiation, and the irradiance of the darkening ultraviolet radiation when a photochromic material is used as the saturable absorber.

The ultraviolet light 120 is then adjusted so that the film 118 has the desired optical density. The stable density D of this photochromic film satisfies the relation $$GI = DHJ + DF$$

where I and J are the irradiances of the darkening and bleaching radiation respectively and G, H and F are constants. Typical values for G, H and F are 0.1, 5 and 0.00025 respectively when I, J are in units of watts/cm$^2$. This relation is plotted in FIG. 5 with the curves labeled according to the transmission $T = 10^{-D}$. For bleaching radiation of intensity J greater than that satisfying the above relation, the material bleaches and T increases.

The lower curve $T = 0.99$ corresponds to the laser threshold selected above. A typical value for the bleaching radiation due to spontaneous emission of the lasing gas is $J_o = 10^{-4}$ watt/cm$^2$. Suppose a threshold of $1.4 \cdot 10^{-4}$ watts/cm$^2$ is desired. The total value of J is then $2.4 \cdot 10^{-4}$ watts/cm$^2$ at threshold level. This value of J and the transmission 0.99 determine the threshold operating point B in FIG. 5, and the operating value of $I_o = 0.6 \cdot 10^{-4}$ watts/cm$^2$. The pre-signal operating point A then has coordinates $J_o$ and $I_o$ and has stable transmission 0.98. The bleaching action will take about 1 minute to bring the material from point A to point B when illuminated with threshold level radiation. At B the mode oscillates. Thresholds of individual modes can be adjusted upwards by increasing attenuation in that part of the mask 116 corresponding to that mode, so that all modes have the same threshold intensity.

As explained by Hardy, each mode is projected onto a circle about 2.5 times the Airy disc diameter on mask 116 and film 118. For typical laser dimensions, these mode circles will be about 0.05 cm. in diameter. Allowing 1% for end mirror transmission, a beam of power no more than 0.025 milliwatts is needed to establish the threshold power density on the saturable absorber, even without allowing for amplification by the lasing material.

Further details of the construction and operation of this multi-mode threshold laser will be found in the specific embodiment section of the previously cited co-pending application entitled *Multi-mode Threshold Laser*.

Figure 6:
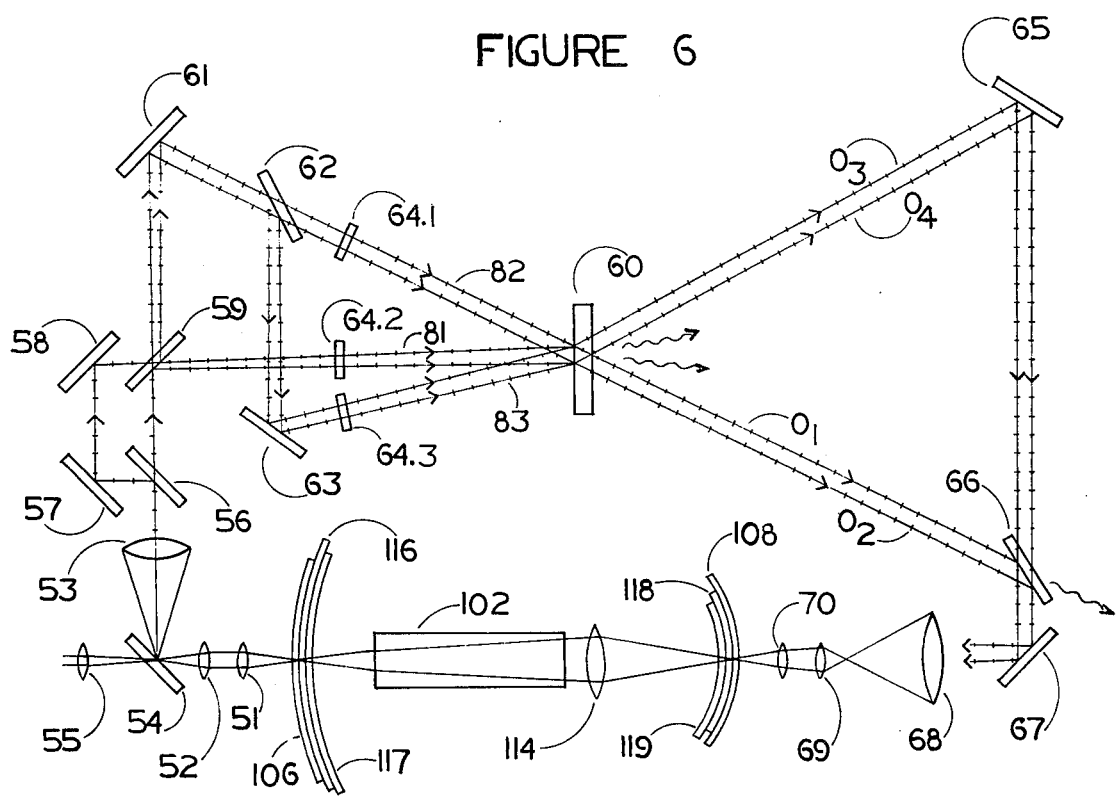
FIG. 6 shows a specific embodiment of the disclosed invention.

A specific coherent optical computer satisfying the requirements given above is shown in FIG. 6, along with the principal parts of the multi-mode threshold laser previously described. The radiation passing through mirror 106 and emanating from the left end of the multi-mode laser is fed by lens 51 into a beam expander (telescope) consisting of lenses 52 and 53 and mirror 54. The beam is thus expanded in size by a factor of about 10. Mirror 54 has a hole equal in size to a projected mode circle so that radiation from mode $M_3$ passes through to lens 55 forming an output indicator or display. Radiation from the other modes is reflected by 54 to pass through lens 53.

Optical beams are shown by hatched arrows to symbolize that they are planewaves. The arrows are along the wave normal and point in the direction of propagation. An optical beam coming from lens 53 is split by semi-mirrors, 56, 59 and 62 and directed by mirrors 57, 58, 61 and 63 to form six distinct beams grouped into three bundles 81, 82 and 83 of two beams each and such that each beam is incident on hologram 60. Bundle 81 is incident approximately normally on hologram 60 while bundles 82 and 83 are at angles 10° and 5° from 81 in the plane of the drawing as shown. The two beams in each bundle diverge at an angle equal to the angular separation of modes $M_1$ and $M_2$ as projected on mask 116 by lens 114 multiplied by the angular expansion ratio of the beam expander. This will be about 0.01 degree. Angles in FIG. 6 are exaggerated for clarity. Wasted light is represented by a sinuous arrow.

Figure 7:
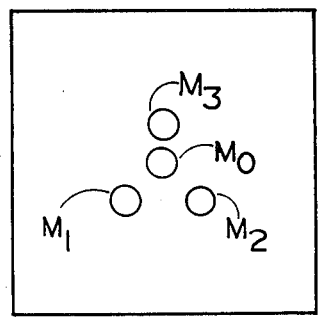
FIG. 7 shows the arrangement of laser modes as they are projected on the saturable absorber film in the specific embodiment of the disclosed invention.

The mode circles are shown in FIG. 7 as they appear on mask 116. Each circle is 0.05 cm. diameter and corresponds to an area of near zero attenuation on mask 116. Outside the circles, the transmission is zero or near zero.

The input variables $x$ and $y$ are stored as planar diffraction gratings (thin hologram elements) in hologram 60 with the bars of the gratings normal to the plane of the drawing. The spacing of the bars of the x-grating is to be such that the beams of bundle 81 are diffracted exactly into the same orientations as the beams in bundle 82, forming beams $O_1$ and $O_2$. Note the bundles are both diverging at the same small angle. Similarly, the y-grating constant is chosen so that the −1 order diffracted beams of bundle 83 are of the same orientation as the −1 order diffracted beam of the x-grating to form beams $O_3$ and $O_4$.

The beams $O_1$, $O_2$, $O_3$ and $O_4$ are reflected by mirrors 65 and 67 and combined by semi-mirror 66 to form four beams $B_1$, $B_2$, $B_3$ and $B_4$ respectively. These beams are passed through lens 70 and the beam expander formed by lenses 68 and 69 so that they are projected on mirror 106 in the rectangular pattern shown in FIG. 8. The angular separation of beams $B_1$ and $B_2$ is equal to the angular separation of $M_1$ and $M_2$ and the separation of $B_1$ and $B_3$ is 1.5 times this amount. The dotted circle just above the $B_1$ and $B_2$ circles is imaged on the mode circle generating the beam entering the coherent optical computer as described above. The linear magnification of lens 70 and the angular magnification of the beam expander formed by 68 and 69 are such that mask 116 is imaged on itself with unit linear magnification and unit angular magnification as projected through the train of the coherent optical computer and lens 114.

Hologram 60 is to be a bleached hologram with a maximum intensity diffraction efficiency of 10% for diffraction grating elements The values of $x$ and $y$ are encoded so that their maximum values (1) correspond to intensity diffraction efficiencies of 10%. The amplitude of the beams diffracted by the x-grating is thus proportional to $x$ and, when combined with the undiffracted bundle 82, produces beams $O_1$ and $O_2$ with amplitudes proportional to sums of $x$ with constant values. Similarly, the $-1$ order diffracted beams of the x- and y-gratings combine to form beams $O_3$ and $O_4$ with amplitudes proportional to linear combinations of $x$ and $y$. The beam dividing ratios of beam splitters 56 and 62 are such that amplitude of the beams 82 are equal to the maximum amplitude of the diffracted $x$ beam (i.e., the amplitude when $x - 1$) and the amplitude of beams in bundle 83 is $\frac{1}{2}$ that in bundle 81. This insures that $O_1$ and $O_2$ will form sums of $x$ and 1, and $O_3$ and $O_4$ will form sums of $x$ and $0.5\ y$.

The proper numerical signs in these sums are obtained by adjusting the dual axis compensator plates 64.1, 64.2, 64.3 placed in the beam bundles 81, 82 and 83. A dual axis compensator is an optically flat plate of clear glass that can be rotated about two axes, one normal to the plane of the drawing and one in the plane of the drawing, the latter being normal to the angle bisector of the two wave normals of the beams in the bundle in which the compensator plate is placed. When the compensator plate is rotated about the latter axis, both beams are advanced or retarded equally in phase. Rotation about the other axis advances one beam in phase and retards the other; with an $x$ hologram in place representing $x = 1$, the compensator in beam 82 is adjusted so that beam $B_2$ has maximum amplitude and beam $B_1$ has minimum amplitude. This means that in $B_1$, the x-diffracted beam is out of phase with the undiffracted beam from bundle 82 and so $B_1$ represents $1 - x$. Similarly, the beams combining to form $B_2$ are in phase so $B_2$ represents $1 + x$. In a similar way, the compensator in beam 83 is adjusted so $B_3$ represents $x + 0.5y$ and $B_4$ represents $-x + 0.5y$.

Figure 8:
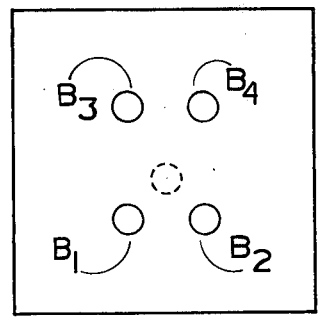
FIG. 8 shows the arrangement of the output beams of the coherent optical computer used in the specific embodiment of the disclosed invention.

Now as pump power to laser 102 is turned on, only $M_o$ will oscillate and the pattern shown in FIG. 8 will be projected on the mask 116 with the dotted circle projected on the $M_o$ mode circle. Thus, beams $B_3$ and $B_4$ will fall on opaque portions of 116 and will have no effect while $B_1$ and $B_2$ will be projected into $M_1$ and $M_2$ respectively. This means $B_1$ is supplying beam $A_1$ and beam $B_2$ is supplying beam $A_2$ as required in Table I. Either $M_1$ or $M_2$ will be stimulated into oscillation by the injected radiation. If $M_1$ oscillates its radiation will cause another beam to enter the coherent optical computer and the pattern shown in FIG. 8 will again be projected on mask 116, but this time the dotted circle will be projected on the mode circle for mode $M_1$. Beams $B_1$, $B_2$ and $B_3$ will fall on opaque material and be lost while $B_4$ will be injected into $M_3$ so that $B_4$ plays the role of $A_3$. It represents the correct value since its amplitude, $-x + 0.5y$, was to be computed if $x$ was negative corresponding to $1 - x$ greater than 1 and $M_1$ oscillating. Similarly, if $x$ is positive, $M_2$ oscillates, $B_3$ representing $x + 0.5y$ is injected into $M_3$ and so has the correct amplitude to serve as $A_3$. Then $M_3$ will oscillate if $f(x,y)$ is greater than the threshold value.

The beams $O_1$ to $O_4$ and $B_1$ to $B_4$ represent their assigned quantities in the sense that their amplitudes are proportional to the represented value with the proportionality constant determined by the intensity of laser beams entering the coherent optical computer. This in turn depends on the pumping rate. The pumping rate should be adjusted, starting from the value previously determined, so that $M_0$ has about 2 milliwatts of output power. This power level is not unreasonable for a He - Ne laser because the term "mode" as used in this disclosure actually comprises several spatially similar axial modes. Then $M_1$ and $M_2$ will have about the same output power since their frequencies will not coincide with that of $M_0$.

When the division of amplitudes at semi-mirrors 59 and 62 is made as previously specified, the output beams $B_1$, $B_2$, $B_3$ and $B_4$ will have a power of about 0.05 milliwatts when they have amplitude representing unity. Since this is greater than the .025 milliwatts previously calculated to be adequate for threshold bleaching, the coherent optical computer delivers sufficient power so that the mode threshold values can be individually adjusted by attenuation.

The term "threshold" is used with several different meanings in this disclosure. The oscillation threshold of the laser is the threshold pump power needed for oscillation of a laser or laser mode. The term is understood as in laser technology. If the modes are degenerate, each has the same threshold. This use of the word "threshold" applies to the multi-mode laser used in constructing the multi-mode threshold laser.

The power, intensity or energy threshold of a mode refers to the property of the beam injected into the mode needed to stimulate that mode into oscillation. This use of the term "threshold" applies to the multi-mode threshold laser.

The threshold value refers to the numerical value of the quantity represented by the beam injected into a mode which corresponds to the power, intensity or energy threshold needed to release that mode. This use of the term "threshold" applies to the disclosed invention as a whole, i.e., to the coherent optical computer combined with the multi-mode threshold laser, and their relationship to each other. The threshold value corresponding to the given threshold intensity depends on the scale factor in the given beam and can be changed by changing the scale factor.

This scale factor can be changed by placing an attenuation in the beam. Suppose a beam represents a value $z$ by an amplitude $A_z$ so that $$z = A_z/A_0.$$

Here $A_0$ may be thought of either as a mathematical scale factor or as the amplitude of a reference beam which represents a unit value of $z$. If the amplitude $A_T$ corresponds to the intensity threshold needed to release a mode and $z_T$ is the threshold value of $z$ which is to release that mode, then $$z_T = A_T/A_1$$

where $Z_1$ is a new scale factor or reference beam amplitude. The required amplitude attenuation $k$ satisfies $$A_1 = kA_0.$$

In the attenuated beam, the amplitude $B_z$ representing the value $z$ is given by $$B_z = A_1 z k A_0.$$

The factor $k$ can be thought of as a mathematical scale factor $k$ imposed by multiplying $z$ by the attenuation $k$ (as in the old incoherent optical computors) or as a change in the amplitude of the reference beam from $A_0$ to $A_1$.

The value of $k$ is calculated by $$k = A_1/A_0 = A_T/(z_T A_0).$$

The value of $z_T$ is given by the algorithm to be carried out. The amplitude $A_0$ may be calculated from the specifications of the coherent optical computer or determined by setting $z = 1$ and measuring the amplitude of the resulting reference beam. The amplitude $A_T$ may be calculated from the pump setting and specifications of the multi-mode threshold laser or determined as the amplitude of the least intense beam need to trigger a mode.

For example, in the beams $O_1$ and $O_2$ in the specific embodiment, the value $z_T = 1$ and $$k = A_T/A_0.$$

Denote by $P_0$ the power of the injected beam needed to release a mode, and denote by $P_1$ the power corresponding to the reference beam with unit value. Then $$P_0/P_1 = (A_T/A_0)^2 = k^2.$$

If the values calculated above were exactly correct, $P_0 = 0.025$ milliwatts, $P_1 = 0.05$ milliwatts and $$k^2 = P_0/P_1 = 0.5$$

Since these values are difficult to calculate accurately, an empirical procedure is to be followed in practice.

As applied to the specific embodiment, the beams $O_1$ and $O_2$ are to be attenuated so that the attenuated beams $B_1$ and $B_2$ have their threshold value (unity) at the threshold intensity of the multi-mode threshold laser. Physically, the attenuation may be obtained either by placing an attenuating filter in beams $O_1$ or $O_2$ or by varying the beam dividing ratio of semi-mirror 66. The final adjustment is made empirically by setting $x = 0$ (unexposed hologram 60), setting the desired pumping rate with $M_0$ oscillating, starting with the attenuation on the high side and decreasing the attenuation until $M_1$ or $M_2$ oscillates.

Similarly, the individual thresholds for $B_3$ and $B_4$ are empirically adjusted with $x = 0.6$ and $y = 0$, with $M_0$ and $M_2$ oscillating at the desired pump setting and decreasing attenuation until $M_3$ just oscillates. Also fine adjustments in untraviolet lamp intensity may be made to secure desired threshold performance. The laser used in this embodiment is not of sufficient power to bleach the photochromic saturable absorber to virtual transparency, but the effect of this residual absorption can be compensated by the empirical adjustment procedure outlined above.

The output of the specific embodiment is given by the final state of oscillation of mode $M_3$ and the information input is regarded as that imposed on the input hologram 60, as previously described.

The coherent optical computer part of this embodiment comprises all elements shown in FIG. 6 except the multi-mode threshold laser components. The coherent optical computer for this embodiment could have been defined to exclude lenses 51, 52, 53, 55, 68, 69 and 70 and mirrors 54 and 67. If that had been done, these optical components would have comprised a means for coupling the coherent optical computer to the multi-mode threshold laser. Or an equally useful delineation could have defined the coherent optical computer to exclude only lenses 51 and 70. In this case lenses 51 and 70 would be the coupling means. Many other variations of defining the coupling means would be equally valid. To avoid such ambiguities, all means for coupling the coherent optical computer to the multi-mode threshold laser have been defined, in this disclosure, to be part of the coherent optical computer. The fact that the output beam from $M_3$ passes through parts of the coherent optical computer is of no significance since it is not altered in information content by that passage nor does it alter the computing action of the coherent optical computer.

Holograms are constructed by causing two coherent optical beams, denoted beam S and beam R, to intersect in a photosensitive material. The incident optical energy causes changes in the optical properties of the material with the greater change where the intensity of the interference pattern is greater. These changes may be brought out by chemical development if necessary. When one beam, say S, is removed, the remaining beam R is diffracted by the hologram so as to reproduce that part of the S beam which passed through the hologram. The efficiency of this diffraction is monotonically dependent on the exposure (the product of the time of exposure and beam intensity) and may be adjusted from zero up to a maximum practical value characteristic of the holographic material and the development process. Several such holograms may be constructed in the same block of photosensitive material either simultaneously or sequentially. In this case, the individual holograms are called hologram elements and their combination may be called a hologram. For low total exposures, in which the total excursion of the changed optical property is much less than its maximum possible value, the relationship between the diffraction efficiencies of the superimposed hologram elements and their individual exposures is the same as for individual holograms. For exposures approaching saturation, the resulting diffraction efficiencies of hologram elements also depends on the total average excursion of the changed optical property. This effect is fully analogous to saturation effects in conventional photography as expressed by the Hurter-Driffield curve. The average total excursion of the changed optical property (in holography) corresponds to a uniform background due to an intense scene illumination or obscuring bright fog (in photography).

DESCRIPTION OF A SECOND EMBODIMENT

The computing system described in detail as the specific embodiment of the disclosed invention has the qualitative features of the disclosed invention. However, due to the low power of the laser employed, the computation rate is quite slow. The second embodiment uses ruby as the lasing material to obtain higher optical powers and will also illustrate a coherent optical computer which evaluates nonlinear polynomial functions of its input data, use of a pulsed laser and use of a control mode.

This embodiment is based on a cubic cavity having a large number of degenerate modes. The cubic cavity was known and discussed by Schawlow and Townes, (op. cit.) as the first potential laser cavity. They pointed out that the cube had modes which consisted of plane waves at various orientations. Although the rigorous theory of these modes requires that they be considered as standing waves, an intuitive understanding of their nature can best be obtained by considering them as traveling waves reflected back on themselves just as an incident plane wave is returned to its source by a corner cube reflector (also called a retro-reflector).

The first lasers were constructed with the purpose of obtaining the most intense possible source of completely coherent light. For this purpose, it is desirable to suppress all but one mode of the cavity since different modes generally oscillate independently of each other so that their radiation is not mutually coherent. With this in mind, Schawlow and Townes selected the most geometrically distinguished mode type in the cube: the plane wave parallel to two opposite faces reflected by these faces as it bounces back and forth between them. By trimming away all but a cylinder stretching from one face to the opposite, to allow access for pump light, Schawlow and Townes delineated the flat plate optical resonator.

For the purposes of the disclosed invention, it is desirable to have a large number of modes which are not distinguished from each other in terms of losses (degenerate modes). Such a collection of modes is found in the cubic cavity as the plane waves traveling approximately parallel to a diagonal of the cube and which are reflected back and forth by the corners acting as retro-reflectors. When such waves exit the cube, they are refracted and bent so that a different plane wave emerges from each face. The exit port must therefore be entirely in one face of the cube so the optic axis cannot be the cube diagonal but must be displaced slightly to intersect a face rather than a vertex. Clearly, the optic axis of a resonant cavity, when considered as a ray path, must close on itself.

The optic axis of the mode bundle used in this embodiment is shown in FIGS. 9, 10 and 11 which respectively show the top, front and side views of the cube. The axis, considered as a ray, returns to itself after six reflections on the faces of the cube. These reflection points are denoted $P_1$, $P_2$, $P_3$, $P_4$, $P_5$ and $P_6$ in order in which they occur in a cycle round the ray path. FIG. 12 shows a view along the diagonal $OP_o$ of the cube.

The cube edge is 10 cm. in length. Point $P_1$ has coordinates $x = 1$ cm., $y = 0$ cm. and $z = 2$ cm. The axes $P_1P_2$ and $P_4P_5$ are parallel to the diagonal of the cube $OP_o$. In conjunction with the laws of reflection, this determines the geometry of the optic axis of the cavity.

Figure 13:
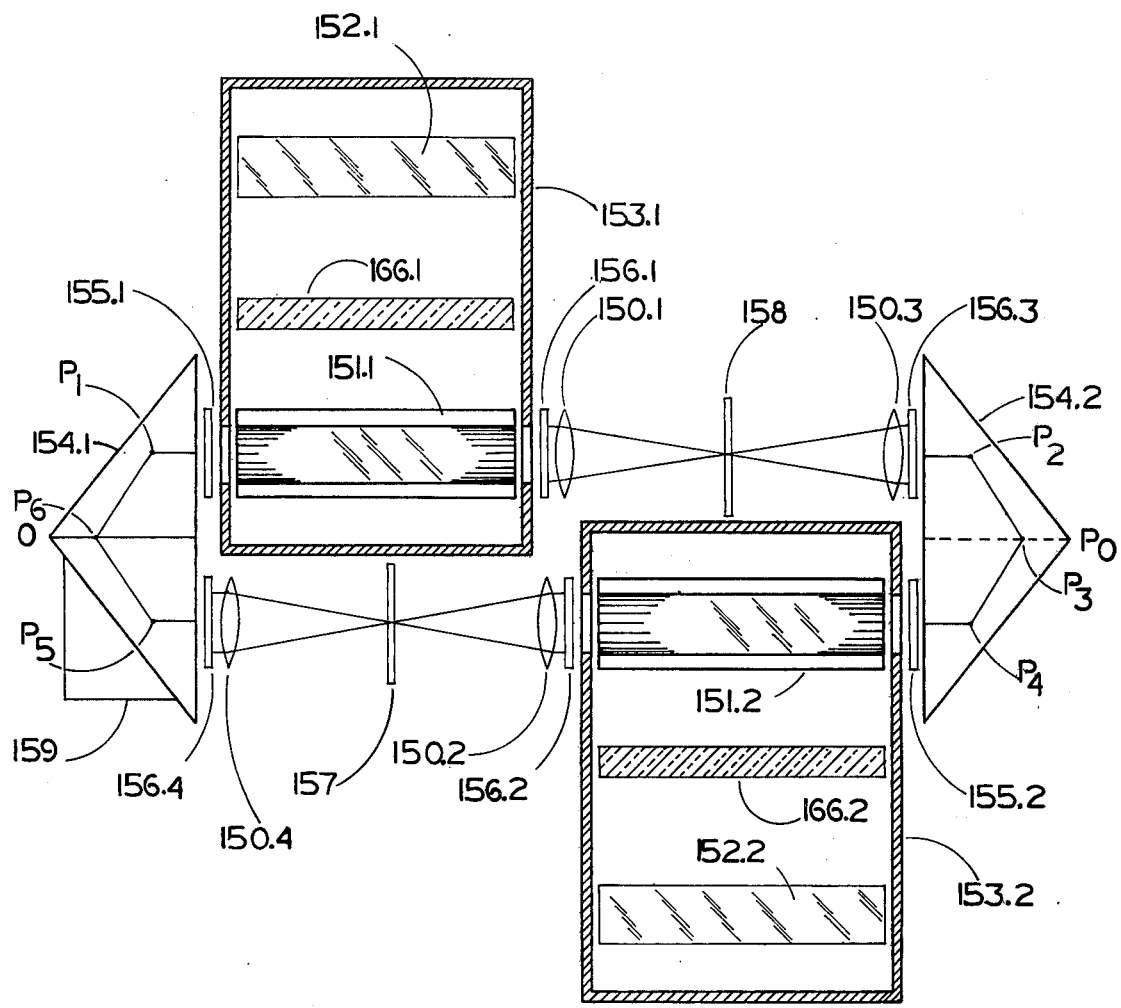
FIG. 13 shows an embodiment of a multi-mode threshold laser in a cubic cavity.

FIG. 13, a projection on the plane of the axes $P_1P_2$ and $P_4P_5$, shows the multi-mode cavity after the unused parts of the cube are trimmed away. The points O, $P_o$, $P_1$, $P_2$, $P_3$, $P_4$, $P_5$ and $P_6$ are in the same geometric relation as in FIGS. 9, 10, 11 and 12. The only remaining solid parts are the corners 154.1 and 154.2 with interior faces normal to the axes $P_1P_2$ and $P_4P_5$.

In order to provide for the spatial separation of the modes, two pairs of lenses are included in the optic axis, one pair in path $P_1P_2$ and the second pair in path $P_4P_5$. Each lens is identical and each pair is separated by twice their common focal length. These lenses should be anastigmatic to have the flattest possible fields at the laser wavelength.

The four lenses used to get spatial separation are denoted 150.1, 150.2, 150.3 and 150.4. Their focal length is 3.3 cm. giving a mode circle diameter 0.0014 cm., about 2.5 times the Airy disc diameter. This multi-mode ring cavity differs from the cavities previously described in that waves traveling in opposite directions around the ring may exist independently of each other, i.e., it has traveling wave modes.

To make this cavity into a laser, amplifying elements 151.1 and 151.2 are added as shown in FIG. 13. These are clad 90° cut ruby rods, 5 cm. long, 1 cm. in diameter and doped to 0.035% chromium ion. The orientation of the c-axis is chosen so that the plane of polarization of greatest gain is inclined about 120° counter clockwise from horizontal right when looking from $P_4$ to $P_5$ and from $P_2$ to $P_1$. The cladding is sapphire of diameter 1.5 cm. to promote even pumping of the ruby. At the end of the rod nearest the cube corners, an aperture of about 0.9 cm. diameter is installed so off axis modes are entirely within the ruby rods.

When lenses 150.1, 150.2, 150.3 and 150.4 are separated by twice their focal length (in terms of optical distance), each common focal plane is imaged on itself with unit lateral and angular magnification. This reduces mode "walk-off" (losses due to apertures in the cavity) and tends to equalize the gains of off axis modes. When the indices of refraction of the ruby rods and corner reflectors are taken into account, the lens spacing shown in FIG. 13 is derived.

The ruby rods 151.1 and 151.2 are pumped by Xenon flashlamps 152.1 and 152.2 housed in elliptical cylinder reflectors 153.1 and 153.2 with lamp and ruby at the foci. The pumping system includes heat-absorbing glass filters 166.1 and 166.2 which absorb all wavelengths longer than about 0.7 micrometers and pass shorter wavelengths. These filters help to keep the rubies cool without greatly reducing pumping efficiency since the ruby is pumped in bands of wavelengths shorter than 0.7 micrometers.

The corners of the cube 154.1, 154.2 are made of optical glass. Since the optic axis makes an angle of about 55 degrees to the normal to the cube face, plane waves traveling approximately parallel to the optic axis will be totally reflected at $P_1$, $P_2$, $P_3$, $P_4$, $P_5$ and $P_6$. Included in the cavity are optical rotator and polarizer assemblies 155.1 and 155.2 consisting of a linear polarizer and two retardation plates (sometimes called compensation plates). The polarizers are adjusted to coincide with the direction of polarization of the radiation incident on the ruby rods which is amplified most by the ruby. When linear polarized light is totally reflected, it is converted to elliptically polarized light. This elliptically polarized light is converted to linearly polarized light by one retardation plate and this is rotated to the favorable plane of polarization by the other retardation plate.

Decoupling from the cavity is obtained by placing a glass prism over the face of the cube containing $P_5$. The distance between the prism face and the cube face is adjusted to frustrate the internal reflection sufficiently to give a transmission of 0.5 for a ray parallel to the optic axis. Information on frustrated total internal reflection may be obtained from an article by L. Bergstein, et al, in *Proc. I.R.E., Vol.* 50, No. 8, p. 1833, Aug. 1962. The decoupling prism is shown symbolically as item 159 in FIG. 13.

The laser thus described constitutes a multi-mode laser. The modes are plane waves in the ruby rods 151.1 and 151.2 which are focused to points in the common focal planes of lenses 150.1 and 150.3 and lenses 150.2 and 150.4 and reprojected as plane waves by these lenses. The Fresnel number of this cavity is quite large so diffraction losses are negligible. The geometric optics description of the modes is entirely adequate. However, modes which are symmetric with respect to the optic axis are coupled to reflection at the flat faces of rods, filters, etc. Since the modes must be independent, only modes on one side of the cavity are used. To suppress the modes in the other half, an opaque foil 158 is placed in the common focal plane of 150.1 and 150.3 with one straight edge of the optic axis.

The gains of the modes traveling at small angles to the optic axis are nearly equal because the geometry of each mode is nearly equal to every other, i.e., the modes are degenerate. The common focal plane of 150.1 and 150.3 constitutes a region of spatial separation and the common focal plane of 150.2 and 150.4 is another. The multi-mode laser shown in FIG. 13 is thus suitable for constructing a multi-mode threshold laser.

The saturable absorber film 157 is introduced in the common focal plane of lenses 150.2 and 150.4. The saturable absorber in this embodiment is unpumped ruby as described by W. Kosonocky in U.S. Pat. No. 3,270,291. For use in a multi-mode laser, the ruby is to be in the form of a thin slab 0.01 cm. thick so as to occupy only the region of spatial separation. The volume of saturable absorber in a given mode is then about $1.5 \cdot 10^{-8}$ cc. The ruby is doped to about 0.75% $Cr_2O_3$ to yield about $3 \cdot 10^{20}$ chromium ions per cc. The absorption of the film should be about 5%. The energy necessary to bleach the saturable absorber can be calculated in exactly the same manner as pump energy needed for oscillation in ruby lasers since bleached saturable absorber is just ruby pumped to unit optical gain. Since about 4 joules per cc. is needed for normally doped ruby (0.05%), this high doping requires about 60 joules per cc. or about 0.9 microjoules in each mode volume. This energy needs to be delivered within the computing cycle which may be about one millisecond so a minimum power of only about 0.9 milliwatt is needed to release a mode. No allowance need be made for incomplete absorption if the input energy is injected into a mode.

Normally doped ruby has been found to suffer no damage up to radiation densities of $10^8$ watts/cm.$^2$. For the higher doping used in the saturable absorber, this limit should be reduced to $6 \cdot 10^6$ watts/cm.$^2$. Since the mode circle is $1.5 \cdot 10^{-6}$ cm.$^2$ area, a total output power of about 4.5 watts per mode can be delivered without saturable absorber damage, allowing for a decoupling factor of one-half.

In this embodiment of the multi-mode threshold laser, pump light tends to bleach the saturable absorber independently of the input signal. Although such an effect can be used to increase sensitivity, better design is obtained by using controlled saturable absorber illumination and blocking stray pump light. The housings 153.1 and 153.2 block most pump light. Undesirable leakage through the ruby rods is prevented by filters 156.1, 156.2, 156.3 and 156.4. These are high pass interference filters with a cut-off wavelength just a little shorter than the ruby wavelength and having maximum transmission of about 95% at the laser time. Although pump light normally incident on such filters may pass through, such radiation will not fall on the saturable absorber. Since radiation of longer wavelength is blocked by heat-absorbing glass filters 166.1 and 166.2, incidence of pump light on the saturable absorber is substantially eliminated.

Absorption losses in the glass components total about 25% but these losses are dominated by the decoupling loss which extracts 50% of the cavity energy on each cavity round trip. The ruby rods have sufficient gain to make up for these losses when pumped with about 18 joules each. Each rod then has a gain of about 1.6 so the total amplification is about 2.5. Of course, the flashlamps will have to deliver much more energy depending on pumping system efficiency.

The energy stored in the pumped ruby not extracted by lasing action is emitted by the ruby as fluorescence at the ruby wavelength. This radiation will necessarily fall on the saturable absorber and tend to bleach it thus reducing the amount of input needed for bleaching. Since 18 joules are needed to achieve oscillation threshold, about 6 joules will be incoherently emitted in a millisecond long computing cycle and cause about 0.5 microjoules to fall on each mode circle of the saturable absorber. The spontaneous emission will not cause enough bleaching to itself release modes when the ruby rods 151.1 and 151.2 are pumped to the oscillation threshold without the saturable absorber in the cavity. However, this fluorescence will decrease the input signal threshold to about 0.4 microjoules at that pumping level.

The above calculation does account for amplification of the fluorescence by the ruby. The ½ microjoule incident on the mode circle is not initially absorbed because its absorption is only about 5%. The remaining 95% traverses the ring, is reduced by losses and restored to the 95% value by the amplification, for a second pass. This is repeated until the entire ½ microjoule is absorbed. However, certain other factors are not included in the above calculation. Hence in any particular set up, empirical adjustment of saturable absorber density and flashlamp pulse energy is necessary to get the desired threshold.

In ruby lasers with traveling wave modes, the first oscillating mode interacts nonlinearly with the amplifying medium to reduce its gain to nearly unity for the oscillating mode and less than unity for all other modes, thus suppressing oscillations in all other modes. Only one mode will oscillate. In a ruby laser with degenerate modes, the gains in the non-oscillating modes will be only slightly less than unity but still will not oscillate. In the multi-mode threshold laser described here, the first oscillating mode is the mode with the greatest injected power. For pump energy not greatly in excess of oscillation threshold, only that mode will oscillate.

FIG. 13 comprises another specific embodiment of a multi-mode threshold laser. Details of its construction and operation are given in the co-pending application previous cited entitled *Multi-mode Threshold Laser*.

The specific coherent optical computer used in this embodiment of the disclosed invention is a modification of the computer described in the previously cited co-pending application entitled *Coherent Optical Computer for Polynomial Evaluation*. In that computer, holograms are arranged to compute the nonlinear polynomial function $ax + exy$ in the input variables $x$ and $y$. The modifications, which are described subsequently, are to enable the computer to produce a fixed value reference beam (independent of the input data) and also to enhance the appearance of the drawing when shown with the multi-mode threshold laser. These modifications do not change the computing action in any way.

Figure 14:
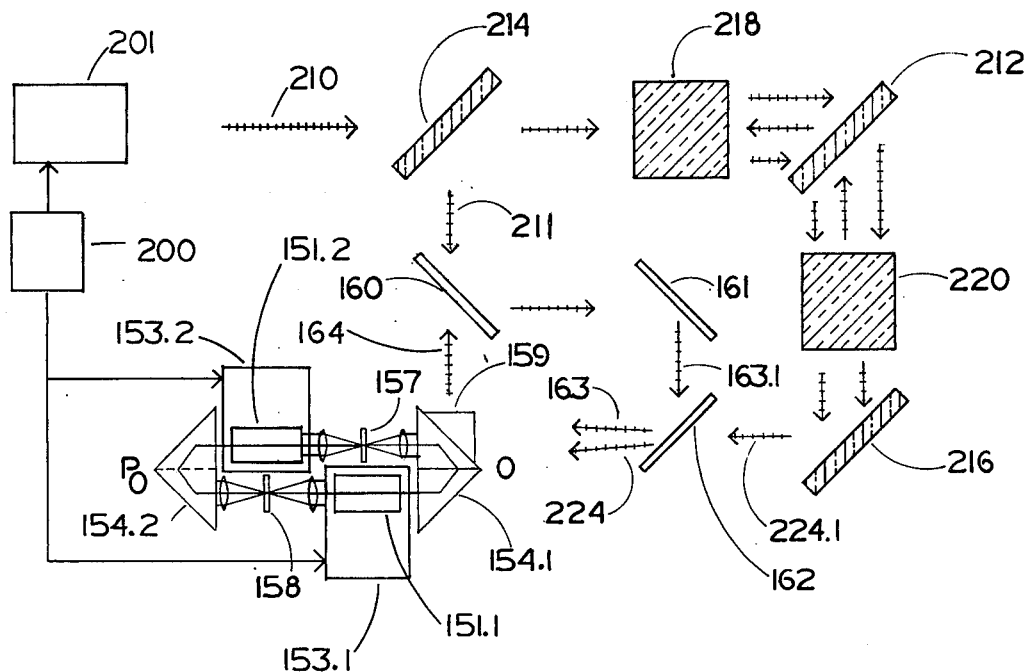
FIG. 14 shows a second embodiment of the disclosed invention.

The configuration of the second embodiment of the disclosed invention is shown in FIG. 14. This figure illustrates only the principal parts of the multi-mode threshold laser and the coherent optical computer and is primarily intended to show how they are coupled to form the disclosed invention. The parts of the multi-mode threshold laser shown in this figure have been designated by the same numerals used to designate that part in FIG. 13.

The input hologram 212 and the holographic mirrors 218 and 220 are arranged as described in the previously cited co-pending application entitled Coherent Optical Computer for Polynomial Evaluation. Program means 214 has been oriented so that it accepts a plane wave beam 210 coming from ruby laser 201. Similarly, coefficient means 216 has been oriented so that its output beam 224.1 proceeds to the left as shown in FIG. 14.

The program hologram 214 splits the input beam 210 into two parts. One part, 211, proceeds downward to provide a fixed reference beam for the control mode of the multi-mode threshold laser. The other part proceeds to the right to produce beams (not labeled) representing $x$ and $xy$. The $x$ beam is produced by diffraction of the input beam by a hologram element representing $x$ in the input hologram 212. The $xy$ beam is produced by a twice diffracted beam, diffracted at both $x$ and $y$ hologram elements in 212, as directed by holographic mirrors 218 and 220. The beam 224.1 representing $ax + exy$ is produced in coefficient means 216 by combining beams representing $x$ and $xy$ coming from means 212 through 220. The relative efficiency of the action of 216 as a semi-mirror combining the $x$ and $xy$ beams represents the coefficients $a$ and $e$.

The means 212, 214, 216, 218 and 220 are all thick holograms which achieve beam directing, beam splitting and beam combining by three dimensional planar diffraction gratings acting as hologram elements. Thus all beams indicated in the drawing by cross-hatched arrows are plane waves. These hologram elements may typically have intensity diffraction efficiencies of 10% to 20%.

When a thick hologram is constructed with plane wave beams R and S, the hologram has the form of planar parallel layers of optically altered material, i.e., a three-dimensional diffraction grating. Any plane wave incident at the same angle to these layers as the reference beam R (i.e., at the Bragg angle) will be strongly diffracted by this grating while any incident plane wave making a different angle will be only weakly diffracted. The diffracted beam has an angle with the layers just as if it were reflected by a mirror parallel to those layers. The hologram may thus act as a selective beam director or synthetic mirror. By jointly selecting the orientation of the various beams and hologram gratings in the computer, it can be arranged that certain beams will be diffracted by certain hologram elements and not by others. Thus several beams incident on a holographic means may be individually directed to different specific directions according to a prescribed plane.

When plane wave beam R is incident on the hologram at the proper Bragg angle, part is diffracted and part continues through the hologram. The hologram thus acts as a beam splitter (or semi-mirror) by dividing the incident beam into a diffracted beam and an undiffracted beam. When both the R and S beams are incident on the hologram, the diffracted part of beam R has the same wave shape and orientation as the undiffracted part of beam S so that the hologram acts as a beam combiner.

The orientation of the $x$ and $y$ hologram elements in hologram 212 are chosen so that the input beam is strongly diffracted by the $x$ element but not by the $y$ element. These hologram elements are constructed to have amplitude diffraction efficiencies proportional to $x$ and $y$ respectively. The $x$ diffracted beam incident on mirror means 220 is split and part returned to the input means at an orientation that will be diffracted by the $y$ element in 212 but not by the $x$ element. Orientation of other beams and holograms are chosen to guide the twice diffracted beam, now representing $xy$, back through means 220 to the coefficient hologram 216.

The hologram elements in 216 are each constructed with beam 224.1 as the S beam. One element is constructed with the $x$ beam as the R beam and exposed to give an amplitude diffraction efficiency proportional to the coefficient $a$ and inversely proportional to the amplitude of the $x$ beam when $x = 1$. The other element is constructed with the $xy$ beam as the R beam and is given a diffraction efficiency proportional to the coefficient $e$ and inversely proportional to the amplitude of the $xy$ beam when $x = y = 1$. The proportionality constants are to be the same in each case. Since both exposures are made with the same S beam 224.1, the diffracted $x$ and $xy$ beams will combine into beam 224.1 with the same phase, so their amplitudes will add as real variables to give beam 224.1 an amplitude proportional to $f(x,y)$.

Holograms 212, 214, 216, 218 and 220 can be constructed in a fine-grained photographic film such as Eastman Kodak 649F which is then to be developed and bleached according to processes obtainable from the manufacturer. If necessary, two such films can be combined to give a higher diffraction efficiency in the mirror means 218 and 220. Or, in this embodiment, one or both of the holograms 218 and 220 may be replaced by conventional semi-mirrors to give a stronger return beam.

Suppose that $a = 1$, $e = 0.5$ and the threshold value of $f(x,y) = 1$. Then the beam representing $f(x,y)$ may have an intensity (at the threshold value) of about $0.5 \cdot 10^{-5}$ times the intensity of beam 210. This allows for 4 diffractions of 10% efficiency each and 2 diffractions of 20% efficiency each in the weakest ($xy$) beam, other losses of 50% plus an increase in intensity due to combination of the two beams. The threshold will also be triggered if $f(x,y)$ is less than $-1$ in the specific algorithm implemented here.

The holographic part of the coherent optical computer is augmented by semi-mirror 162 and by mirrors 160 and 161. The mirror 160 reflects beam 211 to mirror 161 to form beam 163.1 which is reflected at semi-mirror 162 to form beam 163. Beam 224.1 is transmitted through semi-mirror 162 to produce beam 224.

The beam 210 is the optical input beam to the coherent optical computer and beams 163 and 224 are the output beams. Beam 163 could alternately have been produced by program means 214 acting to split beam 210 and by coefficient means 216 acting to redirect this beam to the left. Still a third method of producing beam 163 would require diffraction from a hologram element of maximum diffraction efficiency (representing a scaled value unity) in input means 212. The use of mirrors 160 and 161 and semi-mirror 162 is not necessary but merely simplifies construction of coefficient means 216.

The multi-mode threshold laser is positioned as shown in FIG. 14 so as to accept beams 163 and 224. Since the laser emits plane waves from each mode and the beams 163 and 224 are plane waves, no lenses or other coupling devices are needed to couple the modes to the output beams of the coherent optical computer. It is only necessary to obtain the correct orientation of the plane waves 163 and 224. The orientation of beam 163 is adjusted by changing the orientation of mirror 161. The correct orientation of beam 224 is assured by constructing the hologram 216 with a beam of the same orientation as the beam 224.1 which will be accepted by the assigned mode of the multi-mode laser. Alternately the modes of the multi-mode laser which are to perform threshold operations on these beams may be selected as those modes which beams 163 and 224 naturally enter.

Two modes of the multi-mode laser are used in this embodiment and are designated $M_1$ and $M_2$. Mode $M_1$ is to oscillate if and only if the function $f(x,y) = ax + exy$ exceeds its threshold value. The beam 224 representing the value of $f(x,y)$ is to be injected into $M_1$. Mode $M_2$ is to oscillate otherwise, i.e., it is the control mode. The beam 163 is injected into mode $M_2$. The efficiency of coupling of beam 210 to beam 163 is adjusted to that value which is realized by the holographic part of the coherent optical computer when $f(x,y)$ has its threshold value. Thus when $f(x,y)$ has its threshold value, beams 163 and 224 will have equal intensity regardless of the intensity of beam 210.

When used with a pulsed laser source, the coherent optical computer could be considered as representing its output at the peak of the pump pulse. This definition eliminates ambiguities arising from source intensity variations throughout the pulse. It is usually more expedient to regard the coherent optical computer output as given in terms of a reference beam which would occur if the values of the variables encoded into the hologram 212 were such as to cause the output to have a value unity. The value represented is (except for a mathematical scale factor) the ratio of the amplitude of the actual beam to the amplitude of the reference beam. This representation is valid throughout the pulse since the reference beam changes also as the source intensity varies. Assuming the same mathematical scale factors in each beam, the reference beam for the control mode will have exactly the same intensity as the reference beam for the output beams regardless of the time in the pulse cycle and regardless of pulse shape. Therefore, the correct mode will oscillate regardless of pulse shape. This will be $M_1$ if beam 224 has the largest value.

Modes $M_1$ and $M_2$ should be chosen to be of equal gain. The gains may be equalized by placing attenuating material in the mode of highest gain, e.g., in the mode circle as projected on the plane of 158. Or the intensity of beam 163 may be empirically adjusted by changing the reflectivity of mirror 161 so that modes $M_1$ and $M_2$ have equal tendency to oscillate when beam 224 has the threshold intensity.

In the operation of this embodiment, conventional ruby laser 201 produces a 0.2 joule pulse of radiation which forms beam 210. The pulse is synchronized with the pulses of the flashlamps of the multi-mode threshold laser by pulse synchronizing device 200. This may be simply a common source for the trigger pulses. Or a slight delay of one pulse or the other may be electronically realized to optimize system performance.

As stated previously, the efficiency of the holographic part of the coherent optical computer is greater than $0.5 \cdot 10^{-5}$ so beam 224.1 has an energy of 1 microjoules at least. Since semi-mirror 162 can be nearly completely transparent (beam 163 will be very small compared to beam 210), no further attenuation except the coupling loss need be considered. Thus an energy of 0.5 microjoule will be incident on a mode circle on the saturable absorber and this has been found sufficient for mode release. Whichever of modes $M_1$ or $M_2$ has the greatest input energy will oscillate first and suppress oscillation in the other. Radiation emitted from the oscillating mode constitutes the output beam 164. If desired, this beam may be reflected from the lower side of 160 to proceed to the left, where it may form a display or be used for other data processing purposes.

DESCRIPTION OF A THIRD EMBODIMENT

Figure 15:
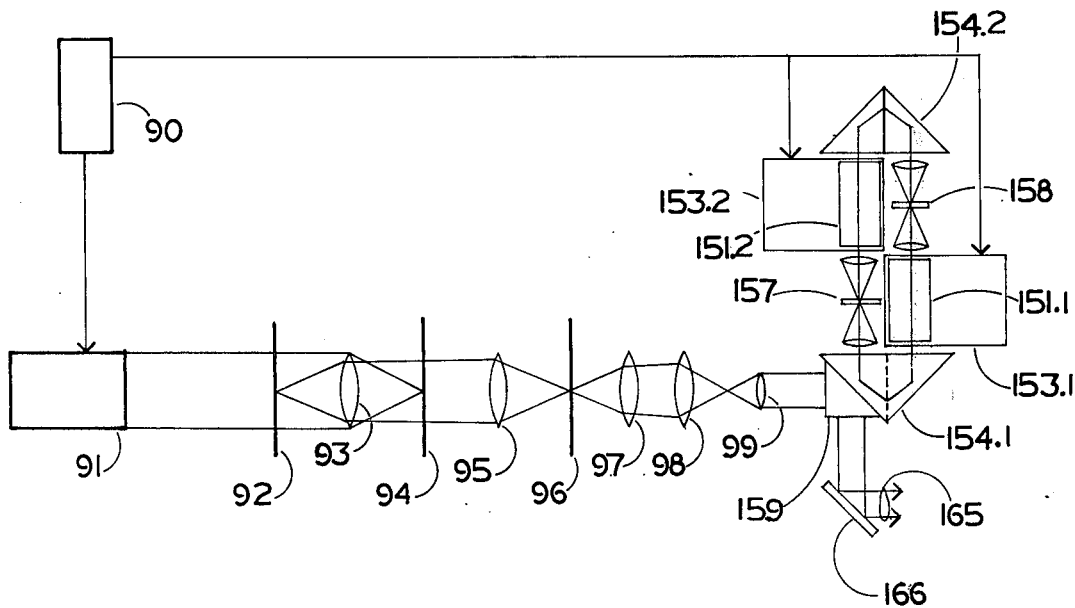
FIG. 15 shows a third embodiment of the disclosed invention.

The cubic cavity multi-mode threshold laser shown in FIG. 13 can be used to theshold the outputs of a coherent optical spatial filter (a special type of coherent optical computer) as shown in FIG. 15. An excellent summary article on pre-holographic optical spatial filters has been presented by L. J. Cutrona, E. Leith, et al., in IRE *Transactions on Information Theory*, Vol. IT-6, p. 386, June 1960.

As used in conjunction with the multi-mode threshold laser, the spatial filter is provided with an optical input beam from a conventional ruby laser 91 of about 2 joules energy output, in one-plane wave mode. It should be recalled that the term "mode", as used in this disclosure, is composed of hundreds of axial modes. Several adjacent transverse modes may also be included if mode circle size, hologram diameters, etc. are such as to render adjacent transverse modes spatially indistinguishable. A 2 joule beam of this characteristic is therefore easily obtained.

The beam from laser 91 illuminates an input transparency 92 placed at the focal point of lens 93. The Fourier transform of transparency 92 is produced in the plane 94 which is the second focal plane of lens 93. Masks and transparencies placed in plane 94 can affect the spatial frequency content of the transformed or filtered image. Since the undiffracted beam contains no information about the input data, it may be disposed of by a small mirror placed near the focus of lens 93.

The filtered image is projected on plane 96 by lens 95. The output image is in the form of a cross-correlation function of the input transparency 92 and the transform of the filter function. Peaks in the cross-correlation function generally indicate a "match" between input and transformed filter functions. Just as in electronic matched filtering operations, the highest peak represents the best "match," considering the effects of noise. The output 96 of the spatial filter is thus to be inspected to determine the point of maximum intensity. Plane 94 is a focal plane of lens 95.

To find the maximum point, the output 96 of the coherent optical computer is injected into the cubic multi-mode threshold laser as shown in FIG. 15, each point being injected into one mode. Lens 97 adjusts the linear magnification and lenses 98 and 99 form a telescope which adjusts the angular magnification so that the output plane 96 is focused on the saturable absorber 157. Then energy coming through lens 95 and emanating from a point on plane 96 passes through a corresponding point on a field about 1.4 mm square on saturable absorber 157 and then enters a mode of the multi-mode threshold laser cavity. This will provide about $10^4$ distinguishable output indicators. The gains of these modes may be equalized by placing attenuating masks at 158 in the laser cavity. The modes of this embodiment are not marked by separate mode circles in the focal plane but comprise a continuous square field. The parts of the multi-mode threshold laser shown in FIG. 15 have been designated with the same numeral as used to denote that part in FIG. 13.

Simultaneously, conventional ruby laser 91 and the multi-mode laser are pumped under control of the pump synchronizer 90. Just as this pumping starts the effective threshold for radiation entering the multi-mode laser cavity is infinite. As the ruby material is pumped, the threshold is reduced. Simultaneously, the radiation coming from laser 91 is passing through the coherent optical computer and is selectively bleaching the saturable absorber in mode circles corresponding to bright points of plane 96, with the modes corresponding to the brightest points being bleached the most. A threshold level will eventually be reached at which one mode oscillates; this mode must correspond to the brightest point in output plane 96. Since ten thousand numerical quantities each requiring $10^4$ multiplications have been computed and tested in one millisecond, a very high computational rate is achieved here.

The first traveling wave mode excited in the multi-mode threshold laser will capture all the inversion energy and prevent other modes from oscillating provided the pumping rate is not greatly in excess of laser oscillation threshold. The point of maximum intensity of spatial filter output field 96 is thus selected unequivocally and this unequivocally determines the point of maximum value in the spatial filter output. The radiation emitted from the oscillating mode is emitted from the cavity and reflected by mirror 166 to form output beam 165. Focusing this plane wave beam will provide an indication of the mode selected. Or, beam 165 may be used to enter another coherent optical computer, activate display devices or access holographic memories for other data processing purposes.

To verify that enough energy is injected into the mode of maximum intensity to release that mode, it is necessary to estimate the energy efficiency of the coherent spatial filter. This will depend strongly on the nature of the data film 92 and on the filtering process realized by mask 94. It is reasonable to suppose that 1% of the incident energy is diffracted by film 92, 50% lost by the spatial filter 94, 50% lost by cavity coupling and the remainder is divided between the $10^4$ modes. Then if each of these modes receives equal power, the two joule input beam will still deliver 0.05 microjoule to each mode which is enough to release a mode of this multi-mode threshold laser as previously stated. Unequal distribution of energy among these modes, as would be expected if there is a correlation peak, will increase the energy in the peak mode facilitating mode release.

Although less efficient than coherent optical computers which use holographic techniques, this embodiment of the disclosed invention may be useful for inspecting existing film records and microfiche for purposes of feature extraction in a pattern recognition application.

DESCRIPTION OF THE PREFERRED EMBODIMENT

The computing task which this embodiment is to perform is the simultaneous recognition of 100 symbols which may be either one of two characters, such as A or B, and which are to be simultaneously presented in one of three formats: upright, rotated to the left about 8° or rotated to the right by the same amount. The characters are to be presented on a microfilm square with 0.3 cm. side. The output is to be two square images with bright points corresponding to the locations of A and B respectively in the input image and this indication is to be produced regardless of which of the three possible formats is used.

The cavity used in this embodiment is generally the same cubic cavity used in the previous embodiment except that traveling waves of the same orientation, but opposite direction of travel, are coupled to permit the formation of standing waves in the cavity. When standing waves form in a laser cavity mode, that mode cannot capture all the inversion energy because its intensity is zero in the anti-nodes of the standing wave. Thus many modes may oscillate simultaneously in a laser based on a cavity with standing wave modes. To achieve the coupling of oppositely directed traveling waves, the ring path of the cavity used in the previous embodiment is folded so that the axis intersects itself in two points. Semi-mirrors placed at these points split incident radiation into two of the intersecting paths to couple the two directions. Otherwise, the geometry of the cavity remains essentially the same.

Figure 25:
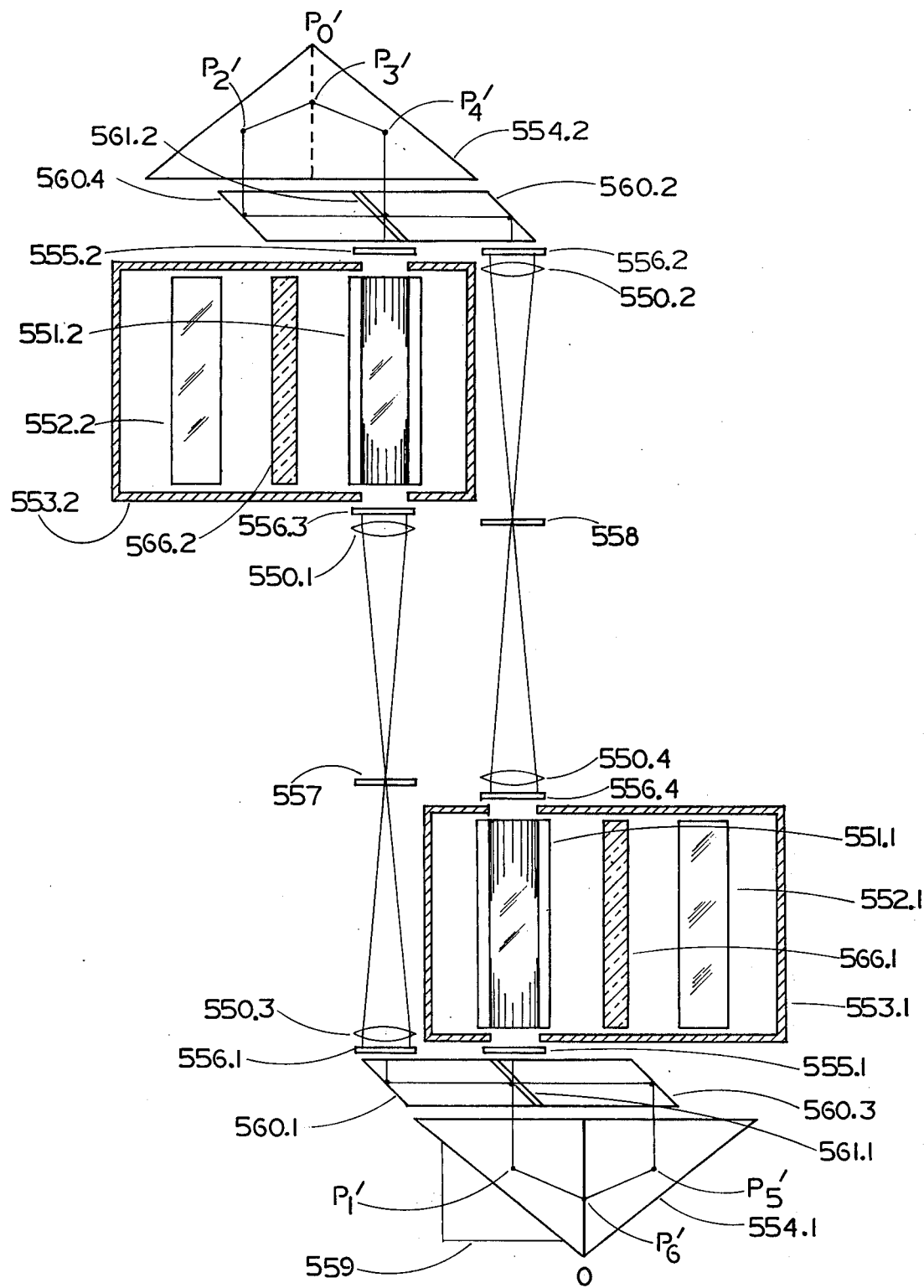
FIG. 25 shows the multi-mode threshold laser used in the preferred embodiment of the disclosed invention.

The multi-mode threshold laser used in this embodiment is shown in FIG. 25. The points O, $P_0'$, $P_1'$, $P_2'$, $P_3'$, $P_4'$, $P_5'$ and $P_6'$ are located analogously to points O, $P_0$, $P_1$, $P_2$, $P_3$, $P_4$, $P_5$ and $P_6$ shown in FIG. 13 except for horizontal displacement in the plane of the drawing of the retro-reflectors 554.1 and 554.2. The ring is closed by rhomboidal prisms 560.1, 560.3, 560.2 and 560.4 so as to intersect itself as shown. Reflections at the prism ends and $P_1'$, $P_2'$, $P_3'$, $P_4'$, $P_5'$ and $P_6'$ are due to total internal reflection in the glass prisms and retro-reflectors respectively. Beam splitting at the intersections is caused by air gaps 561.1 and 561.2 between the prisms. The thickness of these gaps is adjusted to give a splitting ratio of about ½.

Anastigmatic lenses 550.1, 550.2, 550.3 and 550.4 focus plane wave modes on common focal planes securing regions of spatial separation of the modes. These lenses are of equal focal length, 5.5 cm., and are spaced two focal lengths apart (in terms of optical distance) on the optic axis. To avoid internal coupling of modes by reflection at flat surfaces, an opaque metal foil 558 is placed at the common focal plane of lenses 550.2 and 550.4 with one straight edge on the optic axis so as to suppress half the modes.

Clad 90° cut ruby rods 551.1 and 551.2 of 1 cm. diameter and 5 cm. length are pumped by Xenon flashlamps 552.1 and 552.2 housed in elliptic cylinders 553.1 and 553.2 with rod and lamp at the foci. Heat-absorbing glass filters 566.1 and 566.2 reduce ruby heating. The cladding is sapphire of 1.5 cm. diameter. Retardation plate assemblies 555.1 and 555.2, each composed of a quarter wave plate and a half wave plate, convert elliptically polarized radiation to the linear polarized radiation which is most amplified by the ruby rods.

Saturable absorber film 557 is inserted at the common focal plane of lenses 550.1 and 550.3, and is 0.01 cm. thick. High pass filters 556.1, 556.2, 556.3 and 556.4, with maximum transmission at the ruby wavelength, cut off lower frequency radiation and isolate the saturable absorber from the pump light.

Radiation enters and leaves the cavity through a glass prism (shown symbolically as item 559 in FIG. 25) by means of frustrated total internal reflection caused by an air gap between this prism and retro-reflector face containing point $P_1'$. The injected image is to be a telescopic image (focused at infinity) so that an entering plane wave passes through prism 559, retro-reflector 554.1 and rhomboidal prism 560.1 to be focused by lens 550.3 to a point on saturable absorber film 557 and then enters a mode of the multi-mode laser. Radiation from oscillating modes is emitted through prism 559, each oscillating mode producing a plane wave of orientation characteristic of that mode. The emitted radiation thus forms a telescopic image of saturable absorber with bright points corresponding to oscillating modes. The prism 559 could be placed over any face of either retro-reflector to extract mode radiation through that face. The surfaces of prism 559 not in contact with the retro-reflector are arranged so that the extensions of the optic axis of the cavity passing through the prism (in directions determined by refraction of a central ray on the optic axis) pass through the center of a flat portion of a face at least 1 cm. in diameter. These surfaces need not be normal to the optic axis so that the emitted plane waves may be refracted again as they leave the prism.

The active element is ruby, but the saturable absorber is metal-free phthalocyanine dye in a solution of methanol. This dye has a recovery time of about one microsecond. Concentration and thickness of the dye film are chosen to give an absorption of 4%. The dye will then be bleached by an incident power density of 60 watts/cm.$^2$, which implies a power of 0.2 milliwatts injected into a mode will cause bleaching in the slightly larger mode circle of $2 \cdot 10^{-3}$ cm. diameter. Fluorescent radiation incident on the saturable absorber will reduce the required injected power to 0.1 milliwatt. The threshold is specified in terms of power here, rather than energy as in the previous embodiment, because saturable absorber recovery time is very much shorter than the laser pulse interval.

Figure 20:
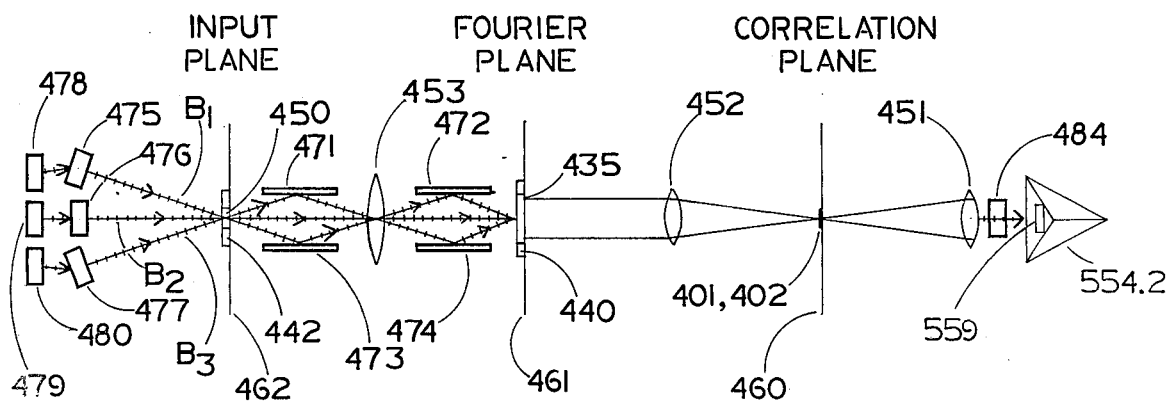
FIGS. 20 and 21 show the top and front views respectively of the preferred embodiment of the disclosed invention.
Figure 21:
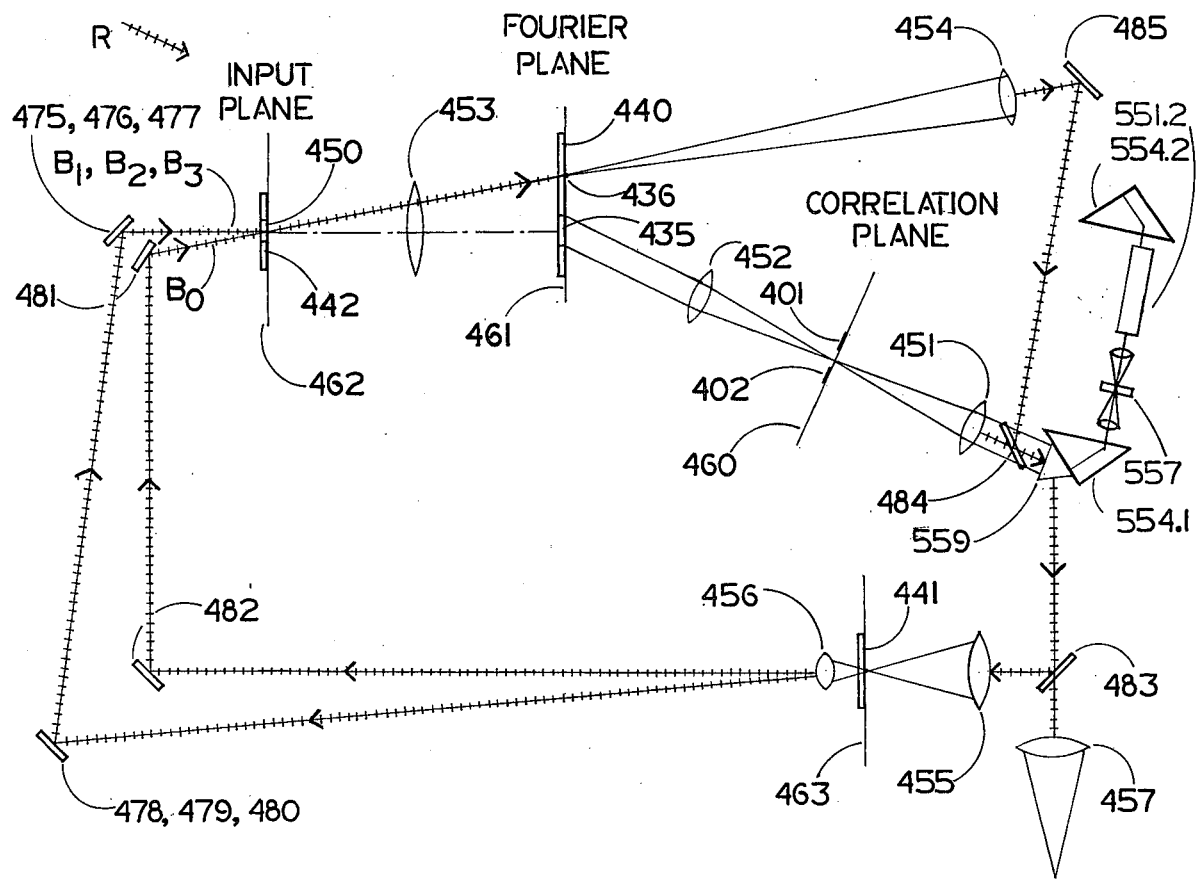

The multi-mode threshold laser used in this embodiment is the same as that described as the preferred embodiment of the previously cited co-pending application entitled *Multi-mode Threshold Laser*. Details of its construction and operation may be obtained from that source. The position of this multi-mode laser is shown in FIGS. 20 and 21 in relation to the coherent optical computer used in this embodiment in terms of its retro-reflectors 554.1 and 554.2 and decoupling prism 559. Also shown are the saturable absorber 557, one ruby rod 551.2 and one lens pair not numbered. The view of FIG. 21 shows a "side" view of this cavity. The other rod and lens pair are behind those shown. The rhomboidal prisms which effect the ring folding are also omitted from FIG. 21.

Figure 16:
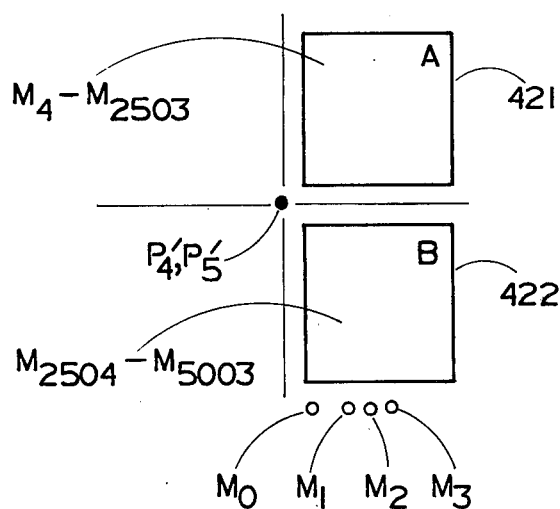
FIG. 16 shows the mode field for the preferred embodiment of the disclosed invention.

The mode field as projected on the saturable absorber film 557 is shown in FIG. 16. The mode circle for the base mode is labeled $M_0$. One of three modes $M_1$, $M_2$ or $M_3$ is to be excited according to the format presented: left tilt, upright or right tilt respectively. The modes corresponding to the output form two square fields designated 421 and 422 which are to indicate the characters A and B respectively. Each field has 2500 modes, thus allowing for 25 separate locations for each of the 100 letters. It is assumed that the letters will be presented in 10 rows of 10 letters each. The modes in field 421 are denoted $M_4$ to $M_{2503}$ and the modes in field 422 are denoted $M_{2504}$ to $M_{5003}$.

Figure 17:
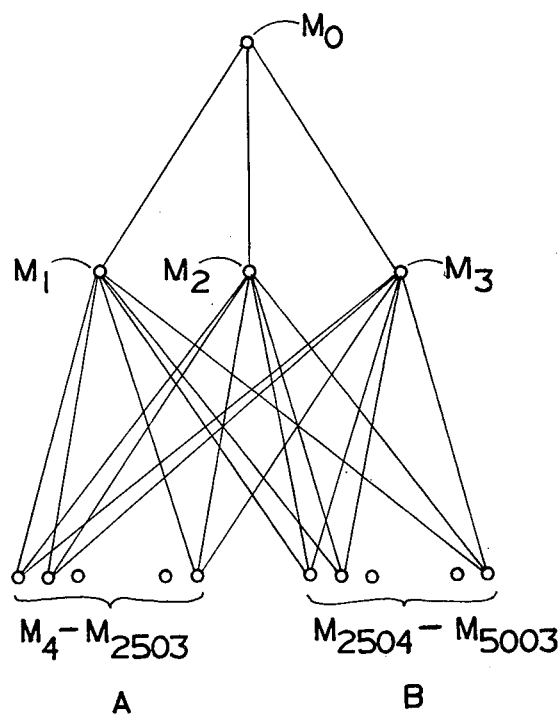
FIG. 17 shows the network of mode coupling realized by the preferred embodiment of the disclosed invention.

The network of mode coupling to be realized by the computer is illustrated in FIG. 17. The couplings between $M_0$ and $M_1$, $M_2$ and $M_3$ are to be proportional to the likelihood that the character set is tilted left, upright or tilted right respectively. The couplings between $M_1$ and $M_4$ to $M_{2503}$ are to be proportional to the cross-correlation function of the character A aligned with the input field, on condition that the input characters are tilted left. This is equivalent to the cross-correlation of a left tilted character A with the input field. The couplings between $M_1$ and $M_{2504}$ to $M_{5003}$ are to be proportional to the cross-correlation function of the character B on the same condition. The couplings from $M_2$ and $M_3$ are to be the same except they are on the condition of upright and right tilted characters respectively. It should be noted that when a sample character is cross-correlated with a similarly oriented (i.e., aligned) field of characters, peaks in the correlation function will occur wherever the characters match. If, however, the sample character and the field of characters are not similarly oriented (i.e., misaligned), these correlation peaks will not occur, or will occur with sharply reduced magnitude. To produce high sharp correlation peaks, the input field should therefore be correlated with a sample character of similar orientation. For a given input field, only one set of coupling links from either $M_1$, $M_2$ or $M_3$ to the other modes is to be realized. Thus each of modes $M_4$ to $M_{5003}$ will have input beams from only one of $M_1$, $M_2$ or $M_3$. For suitable choice of thresholds, only one of $M_1$, $M_2$ or $M_3$ will oscillate and produce the desired cross-correlation function outputs on the fields 421 and 422 respectively. Then, of the modes $M_4$ to $M_{5003}$, only those will oscillate which correspond to a match between the input field and characters A or B.

The mode couplings will be implemented by the coherent optical computer part of the invention, i.e., the coupling functions will be computed by the coherent optical computer. One part of this computer will perform a Fourier analysis on the input text and use the result to couple $M_0$ to $M_1$, $M_2$ and $M_3$. The second part of this computer will act as a Vander Lugt holographic matched filter and form the cross-correlation of the input with the characters A and B and use this cross-correlation to simultaneously provide functionally dependent coupling from either $M_1$, $M_2$ or $M_3$ to modes $M_4$ to $M_{5003}$ according to which of modes $M_1$, $M_2$ or $M_3$ is selected.

The arrangement of the principal parts of the coherent optical computer and the multi-mode threshold laser are shown by a top view in FIG. 20 and by a side view in FIG. 21. However, the top view shows only the matched filter part inasmuch as the Fourier analysis part is clearly described by the side view. Also the side view does not show the left section of the matched filter part inasmuch as this section is clearly described by the top view.

Figure 18:
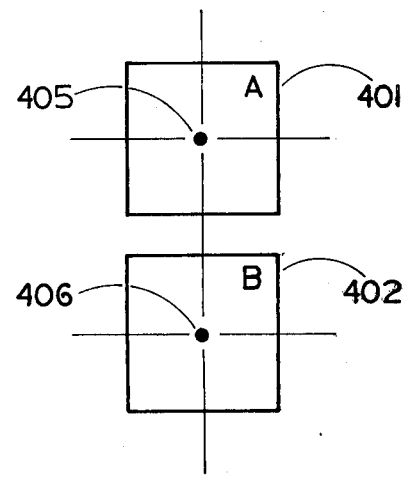
FIG. 18 shows the images projected on the correlation plane of the preferred embodiment of the disclosed invention.

The holographic matched filter is implemented by lenses 452 and 453 which act as the imaging lens and objective lens respectively with input plane 462, Fourier transform plane 461 and correlation plane 460. Two cross-correlation functions are formed in plane 460 as shown in FIG. 18. Field 401 contains the cross-correlation of a character A with the input data 450, and 402 has the cross-correlation with B. Lens 451 images these two fields on the saturable absorber 557 of the multi-mode threshold laser such that 401 is imaged on mode field 421 and 402 is imaged on mode field 422.

Lens 453 also forms the Fourier transform of the input 450 on plane 461 centered around point 436. This transform is coupled to the multi-mode threshold laser by lens 454, mirror 485 and semi-mirror 484.

Output from the multi-mode threshold laser is emitted through decoupling prism 559. Semi-mirror 483 splits the output into a display part imaged by lens 457 and a part for coupling to other modes. The latter part is projected through the telescope formed by lens 455 and lens 456 which reduces the 1 cm. beam diameter to 0.3 cm.

In the operation of the disclosed invention, mode $M_0$ is the first to oscillate. This is assured by removing all saturable absorber from the mode circle of $M_0$ in the saturable absorber plane 557. If the dye cell shown in the description of the preferred embodiment of the previously cited co-pending application entitled *Multi-mode Threshold Laser* is used, the saturable absorber can be removed from a mode circle by cementing a 0.01 cm. thick circle of glass, larger in diameter than the mode circle, between the two outer walls of the dye cell where that mode circle is projected.

Figure 19:
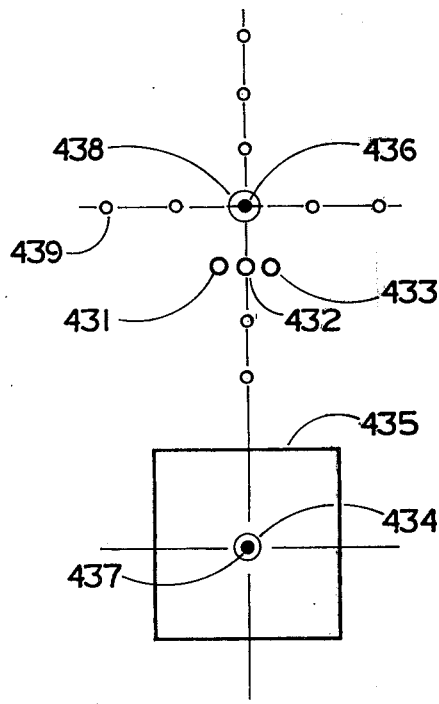
FIG. 19 shows details of the Fourier transform plane of the preferred embodiment of the disclosed invention.

The output beam from $M_0$ is transmitted via semi-mirror 483, through pinhole filter 441 and via mirrors 481 and 482 to form beam $B_0$ which is incident on input film 450 in holder 442 at an angle of 15° to the optic axis as shown in FIG. 21. This beam enables lens 453 to form the Fourier transform centered at point 436 of plane 461. As shown in FIG. 19, a bright central spot 438 is formed over point 436 due to undiffracted light. For typical upright text, bright rays, or series of bright spots, 439 are formed vertically and horizontally from 438 due to light diffracted by the vertical and horizontal lines in the characters. These spots, or rays, are surrounded by a weaker diffuse energy distribution not shown in FIG. 19. If the characters are jointly rotated, the array of spots and rays rotate through a like angle. Pinholes 431, 432 and 433 in opaque mask 440 are positioned so as to pass one of these bright spots when the characters are tilted left, upright or tilted right respectively. Lens 454, focal length 30 cm., projects pinholes 431, 432 and 433 onto the mode circles of $M_1$, $M_2$ and $M_3$ on saturable absorber 557 as shown in FIG. 16, via mirror 485 and semi-mirror 484 and the optical elements of the multi-mode threshold laser. The angular separation of $M_1$, $M_2$ and $M_3$ is about 0.0013 radian.

One of the modes $M_1$, $M_2$ or $M_3$ will be stimulated into oscillation by this incoming energy provided the multi-mode threshold laser is pumped enough to give $M_0$ an output power of 4 watts. About 1% of the beam $B_0$ incident on input 450 is diffracted to the brightest spot and assuming about 0.1 of the energy in the spot is injected into the mode, a power of 4 milliwatts could be available for bleaching. If so, then all three of $M_1$, $M_2$ and $M_3$ could oscillate long before the peak of the flashlamp pulse. The beam $B_0$ should therefore be attenuated so that the oscillation of $M_1$, $M_2$ or $M_3$ does not begin until the power output of $M_0$ is above 95% of its nominal value of 4 watts. Then only one of $M_1$, $M_2$ or $M_3$ will oscillate since the ratio of intensity near the spots 439 to the intensity at the spot center is much less than 0.95, i.e., not enough to release another mode. The required attenuation of $B_0$ can be determined empirically by systematically increasing the attenuation until just one of $M_1$, $M_2$ or $M_3$ oscillates during a computing cycle.

When a mode of the laser oscillates, the total gain in that mode drops to just below unity and all additional pump energy, in excess of that needed to maintain unit gain, goes into stimulated emission, i.e., mode output. Since the saturable absorber in that mode is bleached to transparency, the gain in that mode (except for the saturable absorber) will be just below unity. Were it not for standing waves in the cavity, the gain in the non-oscillating modes would be the same. The gain in the non-oscillating modes will actually be slightly larger since they can extract energy from the undepleted inversion in the region of the anti-nodes of the oscillating mode standing wave. The threshold power of 0.1 milliwatt for a mode refers to a condition in which cavity gain, except for the saturable absorber, is unity, i.e., the gain of an oscillating mode. Since the gain of a non-oscillating mode is slightly larger, their thresholds will be slightly less than 0.1 milliwatt. Consequently, for efficiency greater than $0.25 \cdot 10^{-4}$ for coupling from an oscillating mode to non-oscillating modes, one of the non-oscillating modes will begin to oscillate before the pumping rate has been increased enough to give the oscillating mode a power output of 4 watts. Also if two or more modes are oscillating, they will have nearly the same output power because they are degenerate (except that $M_0$ will have slightly less power because the absorber in the others is bleached to transparency while the very small absorption in the glass replacing the saturable absorber in $M_O$ is not). Thus thresholds of $M_1$, $M_2$ or $M_3$ not yet exceeded as $M_0$ attains 4 watts power output will not be exceeded as $M_1$, $M_2$, or $M_3$ attain 4 watts power output.

The output beams from $M_1$, $M_2$ and $M_3$ are emitted from decoupling prism 559, pass through pinhole filter 441, and the lenses 455 and 456 where the angular separation of these beams is increased to about 0.004 radians. After traveling over an 80 cm. path length, a linear separation of 0.3 cm. has been achieved so these 0.3 cm. diameter beams can be physically separated by mirrors 478, 479 and 480. These separated beams are redirected by mirrors 475, 476 and 477 to form beams $B_1$, $B_2$ and $B_3$ which pass through input data film 450 at 15° off axis to the left, on axis, and 15° off axis to the right respectively as shown in FIG. 20. Angles and sizes of mirrors are exaggerated in FIGS. 20 and 21 for clarity. After passing through 450, these beams are redirected by mirrors 471, 472, 473 and 474 to pass through the holographic matched filter 435 at the same respective angles. Since only one of modes $M_1$, $M_2$ or $M_3$ will oscillate at any one time, only one of beams $B_1$, $B_2$ or $B_3$ will be incident on 435 at any one time. The holographic matched filter 435 is a multiple exposure hologram which will project two of six possible correlation functions on fields 401 and 402 of plane 460 according to which of beams $B_1$, $B_2$ or $B_3$ is incident on it. Correlations with left tilted characters, upright characters or right tilted characters will be produced according to whether $B_1$, $B_2$ or $B_3$ is incident respectively.

The matched filter can be constructed in a separate optical arrangement using standard techniques of multiple exposure holography, but the construction can be most easily carried out in the computer itself. To make the first exposure, the multi-mode threshold laser is formed to oscillate in mode $M_1$ by placing an opaque foil in all other mode circles. A portion of the emitted radiation is extracted from the display created by lens 457 and used to form the plane reference wave R shown in FIG. 21. Wave R is oriented to project a point image at point 405, the center of field 401 (see FIG. 18) in plane 460, when passing through the filter position 435 and lens 452. An unexposed photographic film suitable for holography is placed at 435 and a sample left tilted character A is placed in the input 450. The laser is pulsed and the first exposure is completed. Wave R is then reoriented to project a point image on point 406 at the center of field 402 in plane 460 and a sample left tilted character B is introduced in the input 450. The laser is then pulsed to give the second exposure.

To make the third and fourth exposures, the opaque foil is moved to block all modes except $M_2$. The procedure is then exactly the same as for making the first two exposures except that upright sample characters are used. Similarly, the fifth and sixth exposures are made by blocking all modes except $M_3$ and using right tilted sample characters.

Up to this time, the film has not been moved. When six exposures are completed, the opaque foil is removed from the multi-mode threshold laser, the film is developed, bleached and replaced in position 435. The matched filter holograms should be about 1 cm. in diameter.

The input field has an angular diameter of about 2° and beams $B_1$, $B_2$ and $B_3$ used to construct the holographic filters are separated by about 15°. If the film used to expose the hologram is Eastman Kodak 649F, the film thickness is such that rays from any part of the input field will be diffracted by the hologram but when one of beams $B_1$, $B_2$ or $B_3$ is incident on the input, only the holograms made with that beam will diffract a substantial portion of the radiation. This statement is evident from the results published by E. Leith, et al., *Applied Optics*, Vol. 5, p. 1303, Aug. 1966. Comparable results may be obtained with other films. Thus when mode $M_1$ is activated, only beam $B_1$ will be incident on the input and only the correlations of the input with the left tilted characters A and B will appear in fields 401 and 402 respectively in plane 460.

When the correlation functions are formed in plane 460, they are projected onto the appropriate mode field on the saturable absorber film 557 by lens 451 and the lenses in the multi-mode threshold laser. Of the 4 watts of power generated by mode $M_1$, $M_2$ or $M_3$, only 1% will be incident on each of the 100 letters in the input. For typical letters, about 10% will be diffracted into non-zero order beams that will be useful to the matched filter. An intensity diffraction efficiency of 10% is reasonable for bleached holograms of moderate thickness. This diffracted energy must be divided between the A and B indicating modes. Allowing for coupling loss of ½, at least 0.1 milliwatt is available for bleaching, an amount previously found sufficient for this multi-mode threshold laser. Hence modes corresponding to high correlation peaks may be stimulated into oscillation to indicate recognition.

For this application, the thresholds on $M_4$ to $M_{5003}$ are set sufficiently accurately by pre-setting the pump power pulse. Modes $M_1$, $M_2$ or $M_3$ will have begun to oscillate long before the peak of the flashlamp pulse. The fluorescence is nearly constant as soon as oscillation begins. The bleaching of the modes $M_4$ to $M_{5003}$ will begin as soon as threshold incident power is developed which should occur before the peak of the pumping pulse. Therefore, the exact threshold is determined by the peak power delivered by $M_1$, $M_2$ or $M_3$ and by the peak gain of modes $M_4$ to $M_{5003}$ both of which occur at peak pumping rate. The gain will also depend on the number of modes oscillating. If the number of recognitions cannot be estimated statistically, a control mode with a fixed input valve must be set aside and its output used to suppress laser oscillation either by cutting power to the flashlamp or by an electro-optic shutter in the optical train. Or a large number of control modes could be set aside (in the periphery of the mode fields) all of which have fixed input value and which take up excess inversion energy by their oscillation as the threshold is reached. In either case, the correct flashlamp capacitor voltage should be determined empirically by trials with input data samples of known characteristics.

A typical input is shown in FIG. 22. The corresponding output display is shown in FIG. 23 where oscillating modes are symbolized by solid circles. If the input characters were tilted left or right, the same configuration of output modes would be obtained except that either mode $M_1$ or $M_3$ would be oscillating instead of $M_2$.

When the pattern of mode oscillation illustrated in FIG. 23 is established, the computing cycle is over and a new input film must be provided to the machine if further results are desired. Although a particular sequence of mode oscillation ($M_0$ first, $M_1$, $M_2$ or $M_3$ next, then other modes) is inherent in the computing program, this sequence plays no role in interpreting the results. The computation is essentially parallel in nature since all coupling links on the same level as shown in FIG. 17 are computed essentially simultaneously.

In any particular computing cycle only one beam (from either $M_1$, $M_2$ or $M_3$ acting as the laser source) will be injected into each of the modes $M_4$ to $M_{5003}$. The function represented by the injected beams will be one of three linear functions (the cross-correlation functions previously described). Since the particular choice of function depends on the input data, this embodiment exemplifies the calculation of alternate functions by the coherent optical computer as controlled by provision of alternate optical input beams. In this case the alternate functions are alternate linear segments of a piecewise linear function which is effectively computed by the coherent optical computer.

There is one input variable for each resolution cell on the input film 450 and the value of a variable is the optical density in the corresponding cell. Each of the 5000 output beams computes a different piecewise linear function of these input variables. The intervals on which the function is given by one linear segment are geometrically quite intricate and can best be understood by the feature defining them: type font orientation. In terms of FIG. 17, each coupling link terminating on one of the modes $M_4$ to $M_{5003}$ corresponds to a different linear segment of the piecewise linear discriminant function most pertinent to this pattern recognition application.

OTHER EMBODIMENTS AND SYSTEMS

In the simplest terms, the disclosed invention may be described as a combination of a coherent optical computer and a multi-mode threshold laser positioned relative to each other so that the multiple output beams of the coherent optical computer are injected one-for-one into distinct modes of the multi-mode threshold laser. A laser source of radiation for the coherent optical computer must be provided and the coherent optical computer acts to diffractively couple a mode (or modes) or the source laser to modes of the multi-mode threshold laser. If the laser source of radiation is the multi-mode threshold laser itself, its modes are diffractively, or holographically, coupled by the coherent optical computer. In either case, the amount of the coupling for each mode pair is functionally dependent on the input data of the coherent optical computer. The intensity (or energy) of the beams injected into the modes of the multi-mode threshold laser are proportional to these functions of the input data and the multi-mode threshold laser effects a threshold operation on the values of these functions. Numerous embodiments may be created by coupling various coherent optical computers and various multi-mode threshold lasers according to the above specifications.

Several embodiments of the disclosed invention can be described in terms of variations on the embodiments already described. The arrangement of mode circles shown in FIGS. 7 and 16 may be changed almost arbitrarily. Fewer modes than the number specified may be used in the mode fields of the third and preferred embodiments. All the embodiments may be enlarged or reduced in size from that specified. Various focal lengths and lens diameters may be used. Different materials may be used, in particular different saturable absorbers may be substituted. Saturable absorber dye concentration and thickness may be varied to change the sensitivity of the apparatus. The coherent optical computer described for use in the second embodiment can be used in connection with the He — Ne multi-mode laser described for the specific embodiment and conversely.

The third embodiment may be altered to give improved discrimination by converting to a holographic spatial filter or by using holographic input data. Reducing the doping of the saturable absorber of this embodiment will increase sensitivity at the expense of reliability. Or the ruby saturable absorber may be replaced with the dye saturable absorber used in the preferred embodiment.

The embodiments described in this disclosure were presented as having coherent optical computers which compute real or complex valued functions of real or complex variables. These embodiments may also be considered as dealing with Boolean functions of Boolean variables. This conversion is made by changing only the form and interpretation of the data without changes in the physical structure of the apparatus.

For example, if the variables $x$ and $y$ of the second embodiment are restricted to the binary values 0 and 1 and if the coefficient $a = 0$ and the coefficient $e = 1$, then the coherent optical computer output function $$f(x,y) = ax + exy = xy$$

will have a value of either 0 or 1. It will be equal to unity if and only if the Boolean product of $x$ and $y$ (considered as Boolean variables) is equal to "1". The only change is foregoing the use of the values of $x$, $y$, $a$ and $e$ not equal to 0 or 1. If the threshold is set at ½ the intensity which the coherent optical computer output beam has when $x = y = 1$, then mode $M_1$ will oscillate if and only if $xy = 1$ so that it represents a Boolean function $f(x,y)$. The only change is that oscillation of the mode is read as a Boolean variable rather than an indicator of a threshold crossing. Similarly, $M_2$ represents the complement function $\bar{f}(x,y)$.

Complements may be handled in at least two different ways. In one method, a Boolean variable $p$ is treated as a real variable and subtracted from unity. The linear form $1-p$ has the value 1 or 0 if $p$ has the value 0 or 1 respectively and thus represents $\bar{p}$. The beam representing $1-p$ is formed in the coefficient means (item 216 in FIG. 14) and must be directed back towards a synthetic mirror means 218 or 220 if products with other variables are to be formed.

A better method is to furnish the coherent optical computer the complement of each input variable as if it were another variable. Thus a Boolean variable $p$ may be represented by a hologram element pair denoting (1,0) if it has unit value and by the pair (0,1) if it is zero. The Boolean function $f$ to be evaluated is expressed as a disjunctive normal form in which no complementation operation appears except as applied to the input variables. Then no complementation is necessary, but if a second stage of negation free processing is needed, the complement function $\bar{f}$ must also be computed, e.g., by another disjunctive normal form, or by a control mode for $f$ as mentioned above.

The preferred embodiment has a hybrid interpretation in which the modes $M_1$, $M_2$ and $M_3$ represent three Boolean variables $p_1$, $p_2$ and $p_3$. An intermediate stage of optical processing could be invoked so that certain spatial filters were applied to the alphabetic data if and only if certain logical functions of $p_1$, $p_2$ and $p_3$ were true, for example $p_1 + p_2 = 1$. The film density values representing the characters can still be considered as being real variables represented analogically so that this embodiment illustrates a hybrid computer.

Embodiments of the disclosed invention may be connected together to form systems of increased mode coupling complexity and computational power. In these systems, the output beams of the multi-mode threshold laser which is part of one embodiment of the invention provides the source of radiation for one or more coherent optical computers which are parts of other embodiments of the invention. Or the output beams of several multi-mode threshold lasers, each part of a separate embodiment of the invention, may provide alternate sources of radiation to a coherent optical computer which is part of an embodiment of the disclosed invention. In each case, the outputs of the multi-mode threshold laser may be amplified by a conventional laser amplifier before being conducted to the coherent optical computer. In this way, a network of coupled laser modes is created in which the amount of coupling between two modes is a function of holographically presented input data and the state of oscillation is transferred from one mode to the next if the coupling function exceeds a threshold value. These networks are practical because the multi-mode threshold laser has an output compatible with its input. Information is represented by coherent optical radiation of the same frequency in each case.

An example of such a system is shown in FIG. 24. Here 314 denotes a copy of the second embodiment of the disclosed invention as shown in FIG. 14. Also 315$a$ and 315$b$ denote two copies of the third embodiment of the disclosed invention as shown in FIG. 15 except for the conventional laser source and pulse synchronizer. The two output beams from 314 are denoted 301 and 302. These beams are amplified by conventional laser pulse amplifier 303 and separated by pinhole filter 304 to provide optical input beams 306 and 307 to 315$a$ and 315$b$ respectively. Output beams 308 and 309 of 315$a$ and 315$b$ respectively are combined by semi-mirror 310 to give beam 311. Electrooptic sensor and shutter device 312 shuts off beam 311 as soon as one pulse is detected to give system output beam 313 consisting of just one pulse in one plane wave mode. Mirrors M direct beams 307 and 309 as shown in the figure. The pump pulses for 314, 303, 315$a$ and 315$b$ are synchronized by pulse synchronizer 305 which may be simply a common source for a trigger pulse sent to each laser.

The laser pulse amplifier 303 may be realized as a multi-mode threshold laser of a type described in the second embodiment. By using two modes of widely separated angle (about 2°) and moving the saturable absorber out of the focal plane about 1.5 mm where the mode circles are about 0.5 mm diameter yet still separated, the sensitivity is reduced by a factor of $10^3$. Then about 0.4 millijoules is needed to release a mode but the power output can be $10^3$ times greater without saturable absorber damage. This version can be triggered by the power output of embodiment 314 and will produce the 2 joule output needed for operation of embodiments 315a and 315b.

The mirrors are oriented so that the output field of 315a and 315b are coincident in output beams 311 and 313. The information input transparencies of 315a and 315b are duplicates of each other but 315a has a spatial filter different from 315b. Thus the beam 313 consists of an optical matched filter output with the type of filter selected by the hologram input of embodiment 314.

A network of embodiments of the disclosed invention may perform the same computational tasks of the preferred embodiment. In this system, the coherent optical computer of the preferred embodiment is combined with three lasers:

(1) a conventional ruby laser which provides the base mode $M_0$, (2) a multi-mode threshold laser of the type described in the second embodiment which provides tilt indicating modes $M_1$, $M_2$ and $M_3$, (3) a multi-mode threshold of the type used in the third embodiment which provides character indicator modes $M_4$ to $M_{5003}$.

These lasers are placed adjacent to the multi-mode threshold laser of FIGS. 20 and 21. The mirrors, lenses, etc., of these figures are displaced and reoriented to realize the network of mode coupling shown in FIG. 17. Thus beam $B_0$ is obtained from laser (1) as described above and beams $B_1$, $B_2$ and $B_3$ are obtained from laser (2). Mirror 485 is displaced slightly to direct radiation to laser (2). The correlation plane 460 is projected onto the saturable absorber of laser (3) just as shown in the FIG. 21. Conventional laser amplifiers may be used to amplify the output from laser (2) if desired provided the three beams are amplified independently. Each coupling of the coherent optical computer output beams into modes of a multi-mode threshold laser constitutes an embodiment of the disclosed invention. Such a system uses more equipment than the third embodiment to obtain the same computational result but may have a higher power output or other advantages in special cases.

What is claimed is:

1. A data processor, comprising:
   a multi-mode threshold laser, having at least 25 independent, traveling wave modes, all of substantially the same frequency;
   a source of coherent optical radiation of the same frequency as said modes of the multi-mode threshold laser; and
   a coherent optical computer, for diffracting coherent optical radiation derived from said source and using the diffracted coherent optical radiation to produce twenty-five distinct output beams which are substantially reversals of the beams emitted by said modes of the multi-mode threshold laser; placed adjacent to the multi-mode threshold laser with said output beams impinging on the multi-mode threshold laser; so that each beam of said output beams is injected into exactly one mode of said modes and the oscillation of said mode may be initiated by said output beam.

2. A data processor as specified in claim 1 in which the coherent optical computer includes a hologram for diffracting coherent optical radiation derived from said source.

3. A data processor as specified in claim 2 in which the multi-mode threshold laser has an optically resonant cavity formed by two corner cube reflectors facing each other along a common diagonal, and said independent, traveling wave modes of the multi-mode threshold laser are modes of said cavity.

4. A data processor, comprising:
   a multi-mode threshold laser;
   a source of coherent optical radiation of the same frequency as a mode of the multi-mode threshold laser; and
   a coherent optical computer, for diffracting coherent optical radiation derived from said source, and using the diffracted coherent optical radiation to produce an output beam which is substantially the reversal of a beam emitted by said mode of the multi-mode threshold laser; placed adjacent to the multi-mode threshold laser with said output beam impinging on the multi-mode threshold laser; so that said output beam is injected into said mode, and the oscillation of said mode can be initiated by said output beam.

5. A data processor as specified in claim 4, in which the coherent optical computer includes a hologram for diffracting coherent optical radiation derived from said source.

6. A data processor, with feedback, comprising:
   a multi-mode threshold laser, having a plurality of independent modes of substantially the same frequency, at least one of the modes of the laser, but not all of said independent modes, being in a state of oscillation whenever the data processor is in operation; and
   a coherent optical computer, placed so as to receive coherent optical radiation from at least one oscillating mode of the laser; for diffracting coherent optical radiation derived from an oscillating mode of the laser, and for using the diffracted coherent optical radiation to couple said oscillating mode to an independent mode of the laser not already oscillating; so that the state of oscillation of said independent mode is controlled by the amount of the coupling from said oscillating mode to said independent mode.

7. A data processor, as specified in claim 6, in which the coherent optical computer receives coherent optical radiation from exactly one oscillating mode of the laser.

8. A data processor, as specified in claim 6, in which the coherent optical computer receives coherent optical radiation from at least one oscillating mode of the laser controlled into oscillation by coupling through the coherent optical computer.

9. A data processor, comprising:
   a multi-mode laser, having at least 25 independent bistable modes of substantially the same frequency; each mode of said independent bistable modes having the property that, whenever the multi-mode laser is pumped to a specific operating level, said mode will commence to oscillate at a given time, if the amount of energy entering said mode, from outside the multi-mode laser over the preceding interval of time of a certain duration, exceeds a threshold energy value;

a source of coherent optical radiation of substantially the same frequency of said independent bistable modes of the multi-mode laser; and a coherent optical computer means, for diffracting a beam of coherent optical radiation derived from said source, and using the diffracted coherent optical radiation to produce a plurality of optical output beams having wave front shapes equivalent to wave front shapes of beams emitted by modes of said independent bistable modes of the multi-mode laser, with said optical output beams having a direction of travel opposite to said beams emitted by said independent bistable modes; the coherent optical computer being positioned adjacent to said multi-mode laser with said optical output beams impinging on said multi-mode laser; so that diffracted energy in said optical output beams enters said independent bistable modes, and the oscillation of said modes can be initiated by said beams entering said modes.

10. A data processor, as specified in claim 9, in which the source of coherent optical radiation is a continuous wave laser and said duration of the preceding interval of time is extremely small; so that said independent bistable modes of the multi-mode laser will commence to oscillate if the intensity of the optical beams entering said modes exceeds a threshold intensity value.

11. A data processor, as specified in claim 10, in which the source of coherent optical radiation is a pulsed laser, and said duration of the preceding interval of time is longer than the duration of the pulse of said pulsed laser; so that said independent bistable modes will commence to oscillate if the energy of the optical beam entering said modes, derived from one pulse of said pulsed laser, exceeds a threshold energy value.

12. A data processor, for simultaneously comparing the values of a plurality of functions to a threshold value, comprising:

a multi-mode threshold laser, having a plurality of independent modes of substantially the same frequency;

a source of coherent optical radiation of the same frequency as said independent modes of the multi-mode threshold laser;

a coherent optical computer, placed so as to receive coherent optical radiation from said source, for diffracting coherent optical radiation derived from said source and using the diffracted optical radiation to simultaneously produce a plurality of optical output beams having amplitudes commensurate with the values of said functions, the value of each function of said functions being measured by the amplitude of exactly one beam of said optical output beams, and each beam of said optical output beams having an amplitude commensurate with the value of exactly one function of said functions; and an injection means, for simultaneously injecting said plurality of optical output beams produced by the coherent optical computer into said plurality of independent modes of the multi-mode threshold laser, each beam of said plurality of optical output beams being injected into exactly one mode of said independent modes, and each mode of said independent modes receiving exactly one beam of said optical output beams, so that a mode of said independent modes oscillates on the condition that the function value measured by the amplitude of the beam of said optical output beams injected into said mode, exceeds the threshold value.

13. A data processor, as specified in claim 12, in which the coherent optical computer includes a hologram for diffracting coherent optical radiation derived from said source, and in which the multi-mode threshold laser has at least 25 independent modes of substantially the same frequency; so that the functions may correspond to the resolvable points of an optical image.

14. A data processor, with feedback, for simultaneously comparing the values of a plurality of functions to a threshold value, comprising:

a multi-mode laser, having a base mode with the property that the base mode oscillates whenever the laser is pumped to a specific operating level; and having at least four independent degenerate bistable modes of the same frequency as the base mode, each mode of said independent degenerate bistable modes having the property that, whenever the laser is pumped to said specific operating level, said mode will commence to oscillate if and only if the peak amplitude of an optical beam, of the same frequency as the base mode, injected into said independent degenerate bistable mode, exceeds a threshold value;

a coherent optical computer means, for diffracting a beam of coherent optical radiation derived from an oscillating mode of the laser; and for simultaneously computing the values of said functions; and for simultaneously representing the values of said functions in terms of the amplitudes of a plurality of optical output beams with the value of each function of said functions being measured by the amplitude of exactly one beam of said optical output beams, and each beam of said optical output beams representing the value of exactly one function of said functions;

an optical means for directing coherent optical radiation from oscillating modes of the laser to the coherent optical computer means; so as to provide the coherent optical computer means with the beam of coherent optical radiation derived from an oscillating mode of the laser; and an injection means, for simultaneously injecting said plurality of optical output beams, produced by the coherent optical computer, into said independent degenerate bistable modes of the laser; each beam of said optical output beams being injected into exactly one mode of said independent degenerate bistable modes, and each mode of said independent degenerate bistable modes receiving exactly one beam of said optical output beams; so that a mode of said independent degenerate bistable modes will commence to oscillate if and only if the value of the function represented by the optical output beam injected into said mode, exceeds the threshold value.

15. A data processor, as specified in claim 14, in which the coherent optical computer means receives coherent optical radiation from at least one mode of the laser conditionally brought to a state of oscillation by optical output beams produced by the coherent optical computer means; so as to create a network of coupled modes of the laser and so that the data processor may itself control the identity of functions which are compared to the threshold.

16. A data processor, for simultaneously comparing the values of a plurality of functions, of a plurality of input variables, to a threshold value, comprising:
- a multi-mode threshold laser, having a plurality of independent modes of substantially the same frequency;
- a source of coherent optical radiation of the same frequency as said independent modes of the multi-mode threshold laser;
- a diffractive means, placed so as to receive coherent optical radiation derived from said source; for diffracting coherent optical radiation derived from said source into a plurality of diffracted optical beams having amplitudes commensurate with the values of said input variables, each beam of said diffracted optical beams having an amplitude commensurate with the value of exactly one variable of said input variables, and each variable of said input variables being measured by the amplitude of exactly one beam of said diffracted optical beams;
- an optical means, for simultaneously forming a plurality of optical output beams having amplitudes commensurate with the values of said functions, each beam of said optical output beams being formed by combining a specific combination of diffracted optical beams diffracted by the diffractive means; and each beam of said optical output beams having an amplitude commensurate with the value of exactly one function of said functions, and each function of said functions being measured by the amplitude of exactly one beam of said optical output beams; and
- an injection means, for simultaneously reshaping the wave front shape of said optical output beams, formed by the optical means, to the wave front shape of beams emitted by said independent modes of the multi-mode threshold laser, and for directing the reshaped optical output beams toward the multi-mode threshold laser; and for injecting said reshaped optical output beams into said independent modes, each beam of said reshaped optical output beams being injected into exactly one mode of said independent modes, and each mode of said independent modes receiving exactly one beam of said reshaped optical output beams; so that each mode of said independent modes will oscillate on the condition that the function value measured by the amplitude of the beam of said optical output beams injected into said mode, exceeds the threshold value.

17. A data processor, as specified in claim 16, in which the diffractive means includes a hologram, for diffracting coherent optical radiation derived from said source, and having diffraction efficiencies commensurate with the values of said input variables; so that the diffracted beams have amplitudes commensurate with the values of said input variables.

18. A data processor, as specified in claim 16, in which the diffractive means includes a photographic film for diffracting coherent optical radiation derived from said source and producing diffracted beams having amplitudes proportional to the values of said input variables, each beam of said diffracted beams being distinguished by a unique combination of wave shape, wave front orientation and direction of travel, and in which the multi-mode threshold laser has at least 25 independent modes; so that at least 25 distinct functions may be compared to the threshold, and the functions may correspond to the resolvable points of an optical image.

19. A data processing method, for simultaneously comparing the values of a plurality of functions to a threshold value, comprising the steps of:
(a) providing a pumped multi-mode threshold laser with a plurality of independent modes of substantially the same frequency;
(b) providing a source of coherent optical radiation of the same frequency as said independent modes of the multi-mode threshold laser;
(c) using a coherent optical computer to compute the values of said functions, and to represent values of said functions by the amplitudes of optical output beams derived by diffracting coherent optical radiation derived from said source, each function of said functions being measured by the amplitude of exactly one beam of said optical output beams, and each beam of said optical output beams having an amplitude commensurate with the value of exactly one function of said functions;
(d) injecting said optical output beams, produced by the coherent optical computer, into said independent modes of the multi-mode threshold laser, each beam of said optical output beams being injected into exactly one mode of said independent modes, and each mode of said independent modes receiving exactly one beam of said optical output beams; and
(e) reading the results of the data processing method from the selection of said independent modes of the multi-mode threshold laser which oscillate, the oscillation of a mode of said independent modes being an indication that the value of the function represented by the optical output beam, produced by the coherent optical computer, injected into said mode, exceeds the threshold value.

20. A data processing method, as specified in claim 19, in which the pumping rate of the multi-mode threshold laser is systematically increased from a level near zero, at which oscillation of any mode is impossible, up to a level at which exactly one mode of said independent modes, of the multi-mode threshold laser, oscillates; so that the threshold value is systematically lowered until just that one function, of said functions, with the maximum value has a value which exceeds the threshold value and the optical output beam, produced by the coherent optical computer, representing the value of the maximum valued function causes the mode, receiving said optical output beam, to oscillate; and so that the identity of the maximum valued function may be read from the identity of the oscillating mode.

21. A data processing method, as specified in claim 19, in which one function has a constant value equal to the threshold value and in which the pumping rate of the multi-mode threshold laser is systematically increased from a level near zero, at which oscillation of any mode is impossible, up to a level at which the mode receiving the beam representing said constant valued function just oscillates; so that the pumping rate is thus automatically adjusted to the correct level for the given threshold value.

22. A data processing method, with feedback, for simultaneously comparing the values of a plurality of functions to a threshold value, comprising the steps of:

(a) providing a multi-mode threshold laser having at least five independent modes of substantially the same frequency;

(b) pumping the laser until at least one mode of said independent modes of the laser is brought to an oscillating condition, but a plurality of said independent modes remain in a nonoscillating condition;

(c) using a coherent optical computer to simultaneously diffractively couple oscillating independent modes of the laser to a plurality of said nonoscillating independent modes of the laser, with the amount of the coupling being commensurate with the values of said functions; the amount of the coupling for each pair, consisting of an oscillating mode and its coupled nonoscillating mode, being commensurate with the value of exactly one function of said functions; so that the amplitudes of optical beams coupled into said nonoscillating independent modes are commensurate with values of said functions, each beam of said optical beams being commensurate with the value of exactly one function of said functions; and (d) reading the results of the data processing method from the selection of said nonoscillating independent modes of the laser thus stimulated into oscillation by coupled energy; the condition that a function of said functions exceeds the threshold value being indicated by the oscillation of that mode of said nonoscillating independent modes receiving an optical beam having an amplitude commensurate with the value of said function.

23. A data processing method, as specified in claim 22, in which a plurality of independent modes of the laser remain uncoupled as a result of step (c) and which includes the additional steps of:

(e) using the coherent optical computer to simultaneously diffractively couple a plurality of uncoupled modes of said nonoscillating independent modes of the laser to a plurality of nonoscillating independent modes previously coupled to oscillating independent modes as a result of step (c), each mode of said nonoscillating independent modes being coupled to a plurality of said uncoupled modes, with the amount of the coupling being commensurate with the values of additional functions distinct from the functions previously represented by amounts of coupling; so that a network of coupled modes of the laser is created; and (f) reading the further results of the data processing method from the selection of said uncoupled modes which oscillate as a result of the previous step; so that the partial results of the data processing method may select alternate functions for comparison to the threshold in the further execution of the method.

* * * * *